United States Patent [19]

Hosaka

[11] Patent Number: 4,671,235
[45] Date of Patent: Jun. 9, 1987

[54] OUTPUT SPEED DEPENDENT THROTTLE CONTROL SYSTEM FOR INTERNAL COMBUSTION ENGINE

[75] Inventor: Akio Hosaka, Yokohama, Japan

[73] Assignee: Nissan Motor Company, Limited, Yokohama, Japan

[21] Appl. No.: 698,872

[22] Filed: Feb. 6, 1985

[30] Foreign Application Priority Data

Feb. 7, 1984 [JP] Japan .................................. 59-19364

[51] Int. Cl.[4] .......................... F02D 9/08; F02D 41/00
[52] U.S. Cl. ..................................... 123/352; 123/399
[58] Field of Search ............... 123/352, 361, 399, 400, 123/401, 478, 436; 180/176, 179

[56] References Cited

U.S. PATENT DOCUMENTS

| 3,886,915 | 6/1975 | Taplin | 123/357 |
|---|---|---|---|
| 4,301,883 | 11/1981 | Collonia | 123/352 X |
| 4,453,516 | 6/1984 | Filsinger | 123/352 X |
| 4,470,396 | 9/1984 | Hasumi et al. | 123/478 X |

FOREIGN PATENT DOCUMENTS

| 3209851 | 9/1983 | Fed. Rep. of Germany . |
|---|---|---|
| 3210808 | 10/1983 | Fed. Rep. of Germany . |
| 2009968 | 6/1979 | United Kingdom . |
| 2039092 | 7/1980 | United Kingdom . |
| 2109592 | 6/1983 | United Kingdom . |

OTHER PUBLICATIONS

Society of Automotive Engineers, Inc., "Microprocessor Controls Engine and Transmission", vol. 91, No. 8, Aug. 1983, pp. 42-45.
Schwartz, et al, "Steuerung der Einspritzung und Zuendung von Ottomotoren mit Hilfe der Digitalen Motorelektronik MOTRONIC" Bosch Techn. Berichte 7 (1981) 3, pp. 139-151.

Primary Examiner—Tony M. Argenbright
Attorney, Agent, or Firm—Schwartz, Jeffery, Schwaab, Mack, Blumenthal & Evans

[57] ABSTRACT

A throttle valve control system for an internal combustion engine electrically controls throttle valve angular position in order to control intake air flow rate through an air induction passage of an engine. The system employs an accelerator to produce a signal representative of a required or demanded output speed. Actual output speed is monitored by means of a speed sensor. The actual speed is compared with the output speed demand derived from the accelerator signal to obtain the difference therebetween. Feedback control is performed on the basis of the calculated difference so as to control the throttle valve angular position to increase or decrease the actual output speed toward the speed demand value.

9 Claims, 20 Drawing Figures

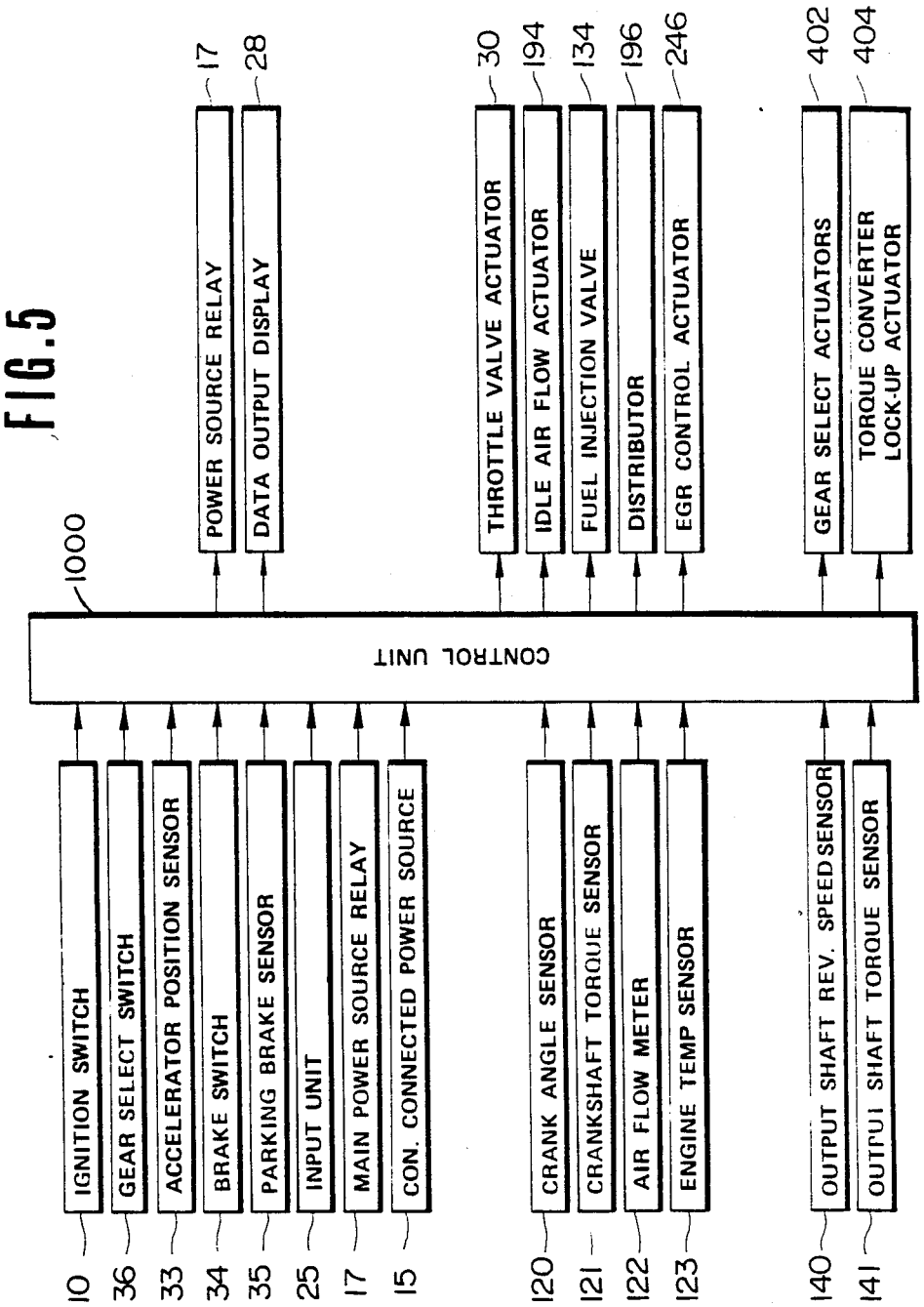

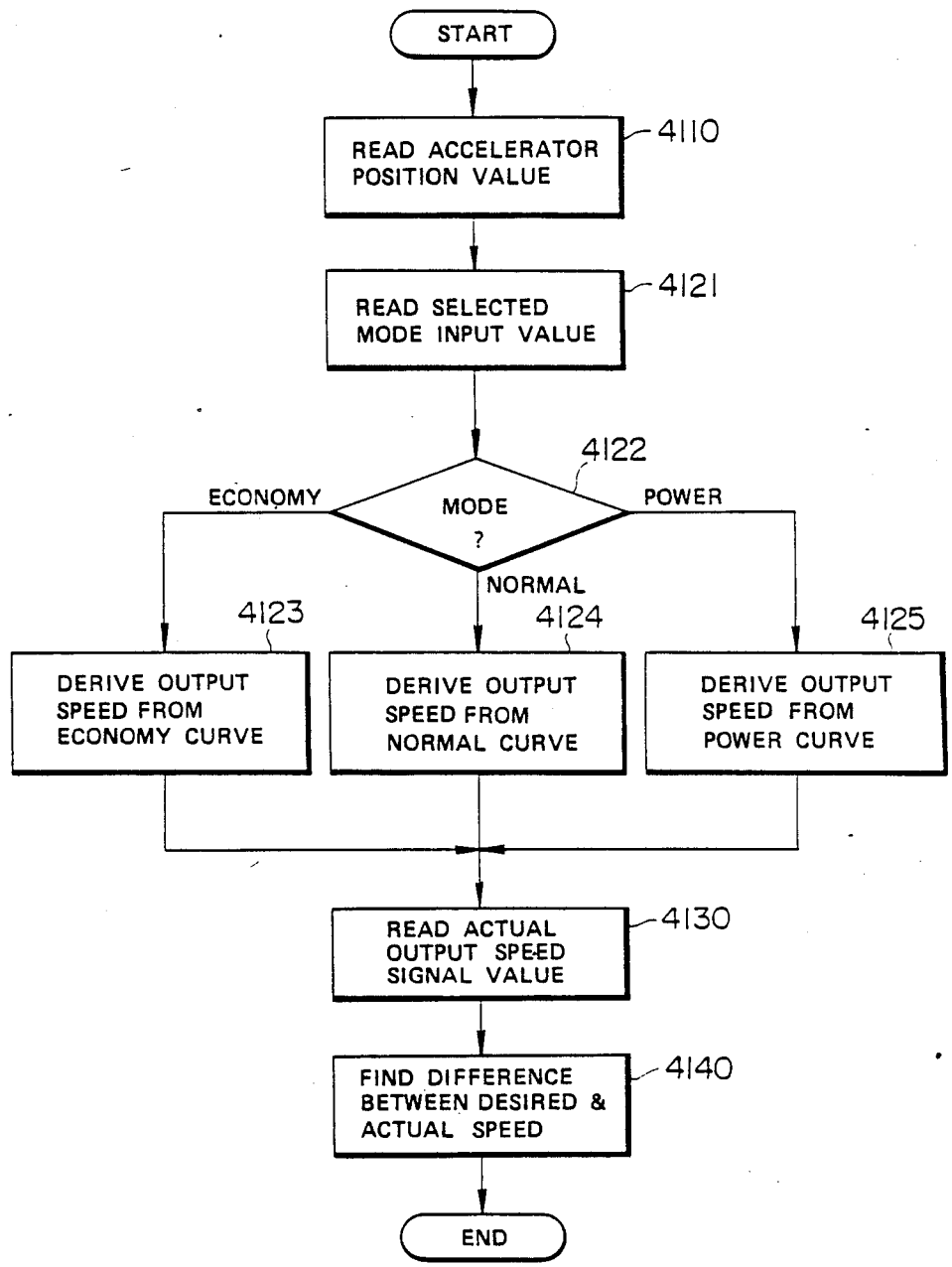

OUTPUT SPEED DEPENDENT THROTTLE CONTROL SYSTEM FOR INTERNAL COMBUSTION ENGINE

BACKGROUND OF THE INVENTION

The present invention relates generally to a throttle valve position control system for an internal combustion engine, in which an electrically or electromagnetically operable throttle valve actuator is employed for controlling the throttle valve angular position depending upon the degree of depression of an accelerator pedal. More particularly the invention relates to a throttle valve position control system which can control the throttle valve angular position depending not only on the accelerator pedal depression but also the difference between the actual output speed of the engine and the desired output speed for optimization of engine performance.

Such throttle valve position control systems have been disclosed in European Patent First Publications Nos. 01 14 401, 01 21 937, 01 21 938, and 01 21 939. In these prior proposals or developments, the throttle valve angular position is generally controlled by an electromagnetic actuator associated with the throttle valve. A throttle control signal is produced depending upon the degree of depression of an accelerator pedal as indicated by a signal generated at the accelerator pedal.

A similar throttle control system has also been disclosed in Japanese Patent First Publication (Tokkai) Showa No. 56-107925, published on Aug. 27, 1981. This document discloses an electronic fuel injection control system for a spark ignition internal combustion engine, which includes a throttle valve servo mechanism operative to control a throttle valve angular position depending upon the degree of depression of an accelerator pedal.

The aforementioned control systems are capable of controlling the throttle valve to a desired angular position corresponding to the depression rate of the accelerator pedals. Therefore, those systems may successful in controlling air induction at a rate corresponding to the accelerator depression degree. Theoretically, control of the throttle valve angular position implies direct control of engine output to obtain desired engine performance. However, in practice, due to production errors among individual engines and the wide range of possible environmental conditions, engine output does not necessarily correspond to the demand on the engine throughout the range of throttle valve angular positions.

There have been proposals for controlling engines or power trains including the engine and a power transmission to obtain output torque precisely corresponding to the output demand. SAE Technical Paper 830423, by the Society of Automotive Engineering, discloses a power train control system controlling the engine in a discrete manner by controlling the power transmission. In controlling the engine, the engine controller detects data from various points in the engine and adjusts fuel supply, ignition timing, EGR flow rate and intake air flow rate to optimal values derived from computations on the detected data. In controlling the transmission, a transmission controller detects engine load and vehicle speed, and derives the gear ratio to be established by the transmission and performs lock-up control on the basis of the results of computations on the detected data.

Another important factor in overall vehicle performance is good response of the driving torque to depression of the accelerator pedal. Specifically, in order to obtain good engine response characteristics to the accelerator pedal position, the output torque produced by the engine must precisely correspond at all times to that demanded manually by means of the accelerator pedal.

However, in practice, the engine output torque transmitted to the vehicular driving wheels tends to fluctuate due to environmental conditions and/or production errors. For example, it is notorious that engine output characteristics fluctuate significantly, even to a disturbing extent, as the engine warms up from a cold-weather start. Furthermore, many vehicles suffer shift-shock during shifting of the automatic power transmission due to deviations in engine speed and thus of engine output. This also degrades not only handling but also riding comfort.

Therefore, it would be desirable for the vehicular power train to provide uniform accelerator response so as to constantly produce an optimal engine output speed at every accelerator position and in every transmission gear position.

SUMMARY OF THE INVENTION

Therefore, it is an principle object of the present invention to provide a throttle valve control system which can control the throttle valve angular position to consistently produce an engine output precisely corresponding to an accelerator position.

Another object of the invention to provide a throttle valve control system which allows variation of response characteristics in accordance with various preset operation modes.

A further object of the present invention is to provide a method for controlling a throttle valve angular position so that the engine output precisely corresponds to the demand indicated by an accelerator position.

In order to accomplish the aforementioned objects, a throttle valve control system, according to the present invention, includes an accelerator position sensor monitoring the position of an accelerator and producing an accelerator position indicative signal, a first arithmetic means deriving an output speed demand value in accordance with the accelerator position indicative signal value, an output speed sensor for monitoring output speed at the output end of a power train including an internal combustion engine and a power transmission and producing an output torque indicative signal, a second arithmetic means comparing the output speed demand value derived by the first arithmetic means with the output speed indicative signal value which is representative of an actual output speed to derive the difference between the demand speed and the actual speed, and a third arithmetic means responsive to the accelerator position indicative signal and the difference between the demand speed and the actual speed to derive a correction value by which to adjust the position of a throttle valve toward a desired position at which the demand speed and actual speed essentially coincide.

Preferably, the system includes a manual selector which allows a user to select one of various operation modes of the power train, which various operation modes correspond to unique response characteristics of control.

In accordance with one aspect of the invention, a throttle valve control system comprises a manually operable output speed demand input means for producing an output speed demand indicative signal having a value varying according to preset variation characteristics in accordance with manual operation, a first sensor, associated with a vehicular power train including the engine, for monitoring the actual output speed of the power train and producing an actual speed indicative signal having a value proportional to the output speed of the power train, an intake air flow rate adjusting means, associated with an air induction passage of the engine, for controlling air flow therethrough, the intake air flow rate adjusting means being responsive to a control signal to adjust the intake air flow rate in accordance therewith, and a controller receiving the output speed demand indicative signal and the actual speed indicative signal and deriving the difference between the signal values thereof, the controller producing the control signal having a value corresponding to the derived difference and thereby controlling the intake air flow rate adjusting means to adjust the actual output speed of the power train toward the manually input speed demand.

According to another aspect of the invention, an air induction rate control system for an internal combustion engine comprises a manually operable accelerator for controlling air induction rate through an air induction passage, a throttle valve disposed pivotably within the air induction passage, the angular position of which depends upon the manually selected position of the accelerator, a first sensor associated with the accelerator for producing a first sensor signal having a value varying according to the position of the accelerator, a second sensor monitoring output of a power train including the engine and producing a second sensor signal having a value indicative of the output speed of the power train, a third arithmetic means, responsive to the first sensor signal for deriving an output speed demand on the basis of the first sensor signal value, a fourth arithmetic means, responsive to the second sensor signal and the output of the first arithmetic means, for deriving the difference between the second sensor signal value and the first arithmetic means output value and deriving a control signal having a value corresponding to the derived difference between the second sensor signal value and the first arithmetic means output value, and a throttle valve servo mechanism responsive to the control signal for adjusting the throttle valve angular position by an amount corresponding to the value of the control signal.

According to a further aspect of the invention, a throttle valve control system for an internal combustion engine comprises an manually operable accelerator, a throttle valve disposed within an air induction passage of the engine for controlling intake air flow rate therethrough, an electrically operable throttle valve servo mechanism associated with the throttle valve to control the open degree of the latter according to a control signal, a first sensor associated with the accelerator for monitoring the position of the accelerator and producing a first sensor signal indicative of the position of the accelerator, a power train including the engine and having an output shaft for driving vehicular driving wheels, a second sensor associated with the output shaft of the power train for monitoring output speed thereon, the second sensor producing a second sensor signal indicative of the output speed on the output shaft, and a controller receiving the first sensor signal and second sensor signal, deriving an output speed demand on the basis of the first sensor signal value according to preset characteristics of variation of output speed demand depending upon the first sensor signal value, deriving the difference between the derived output speed demand and the second sensor signal value representative of the actual output speed, and generating a control signal acting on the throttle valve servo mechanism so as to reduce the difference to zero.

On the other hand, the aforementioned and other objects may be achieved by a process or method of controlling a throttle valve angular position, in which accelerator operating position is generally taken as principle feature of throttle valve position control to derive the throttle valve operating position. The accelerator position dependent operation position of the throttle valve is modified depending upon the difference between actual speed at the output end of a power train and a demand speed value derived from the accelerator position.

In the preferred method, operation mode of the power train may be selected from among various preset operation modes. The demand speed is adjusted with respect to the selected operation mode.

According to a still further aspect of the invention, a process for controlling intake air flow rate through an air induction system of an internal combustion engine by means of a throttle valve, comprises the steps of deriving a desired magnitude of speed to be outputted through a power train including the engine on the basis of the position of a manual accelerator, monitoring actual output speed on the power train, calculating the difference between the desired speed and the actual speed, deriving a control signal having a value acting to reduce the difference between the desired speed and the actual output speed toward zero, and feedback controlling a throttle valve servo system associated with the throttle valve so as to actuate the throttle value to a degree corresponding to the control signal value.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiments but are for explanation and understanding only.

In the drawings:

FIG. 5 is a schematic block diagram illustrating a control unit and its various input and output signals;

FIG. 16 is a flowchart of a modified correction value deriving program executed by the control unit of FIG. 10.

DESCRIPTION OF THE PREFERRED EMBODIMENT

Figure 1:
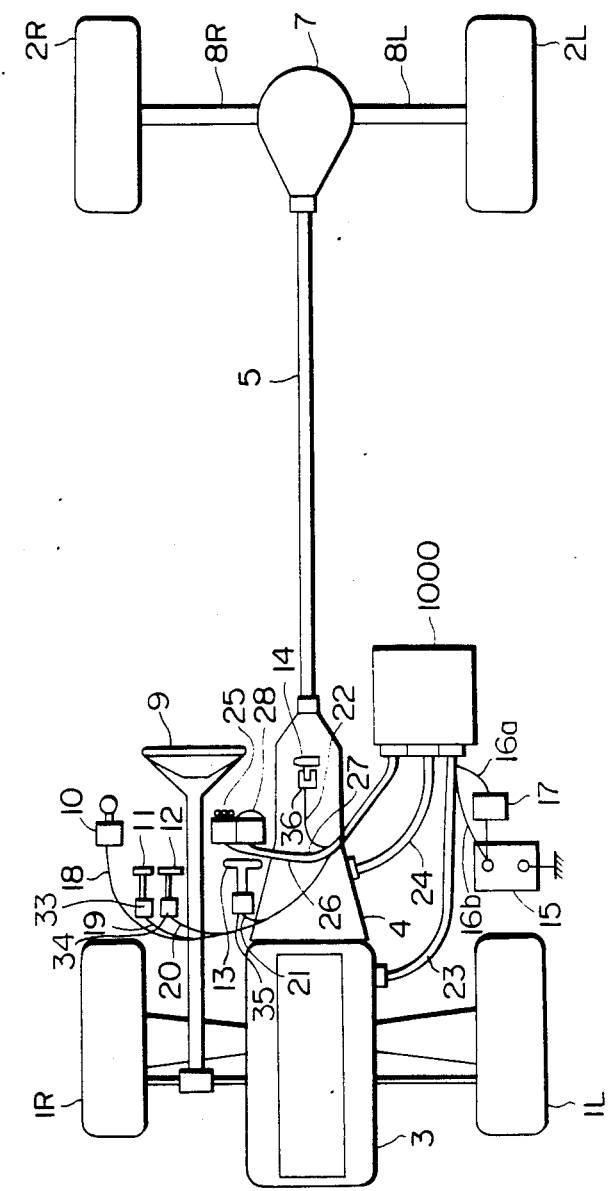
FIG. 1 is a diagram of an automotive vehicle to which the preferred embodiment of a power train control system including a throttle valve control system according to the present invention is applied.
Figure 2:
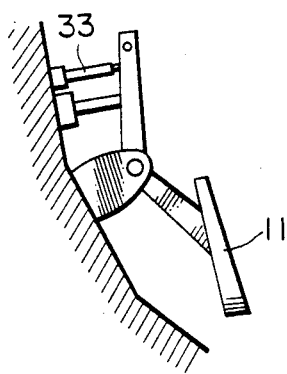
FIG. 2 is an elevation of an accelerator pedal cooperating with an accelerator position sensor to be employed in the throttle valve control system of the invention.

Referring now to the drawings, the vehicle illustrated in part in FIG. 1 has a front-engine, rear-wheel-drive power train which arrangement will be referred to hereafter as "FR arrangement". In the FR arrangement, an internal combustion engine 3 is coupled to a power transmission 4 which is, in turn, connected to a differential gear 7 through a propeller shaft 5. A pair of rear wheels 2R and 2L are driven by the engine output transmitted through the power transmission 4, the propeller shaft 5, the differential gear 7 and drive axles 8R and 8L, and thus serve as driving wheels. Front wheels 1R and 1L freely rotate according to vehicular movement as driven by the rear driving wheels 2R and 2L. The front wheels 1R and 1L are associated with a per se well-known steering system for controlling the vehicle travelling direction. The steering system includes a steering shaft 9 for manual selection of the vehicle travelling direction.

The engine 3 is energized by an ignition system including an ignition switch 10. As is well known, the ignition switch 10 has several discrete switch positions, namely an OFF position in which a vehicle battery 15 is disconnected from a vehicle accessories such as a vehicle audio system, an air conditioner system, and from an ignition coil, an ACC position in which the battery 15 is connected only to the vehicular accessories while remaining out of electrical communication with the ignition coil, an IGN position in which the battery is connected to both the vehicle accessories and the ignition coil, and a START position in which the battery is connected only to the ignition coil. As is well known, the ignition system further comprises a distributor, spark ignition plugs inserted into each engine cylinder, and a circuit breaker or power transistor which is gated by an ignition control signal produced at a given timing by a control unit 1000.

Figure 3:
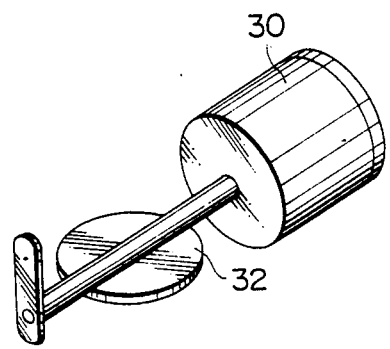
FIG. 3 is a perspective view of a throttle valve actuating servo mechanism in the preferred embodiment of the throttle valve control system according to the present invention.

The engine is also associated with an accelerator 11, such as accelerator pedal manually operated by a driver's foot or a hand-operated accelerator such as is used on motorcycles. The accelerator 11 is generally designed to control engine revolution speed by controlling the open angle of a throttle valve (FIG. 3) so as to control intake air flow rate, in the case of a gasoline engine, or by controlling a fuel injection pump so as to control the fuel delivery rate, in the case of a Diesel engine. The accelerator 11 of the shown embodiment works in conjunction with an accelerator position sensor 33 to produce an electrical signal with a value depending upon the operating position of the accelerator, which electric signal will be referred to hereafter as "accelerator position signal". The accelerator position sensor 33 is connected to an electrically operated actuator 30 mechanically connected to a throttle valve 32 for operating the latter, as shown in FIG. 3. In the case of a Diesel engine, the actuator 30 may be coupled to a governer limiting the fuel delivery rate.

Control of engine speed with the aid of an accelerator signal has been illustrated in European Patent First Publications Nos. 01 14 401, 01 06 360, 01 21 939, 01 21 938 and 01 21 937. The contents of the above identified European Patent Applications are hereby incorporated by reference.

The engine speed thus depends upon the position of the accelerator 11. The output torque of the engine varies according to engine output characteristics specific to each individual engine. The engine output is transmitted to the rear driving wheels 2R and 2L through the power transmission 4, the propeller shaft 5, the differential gear 7 and drive axles 8R and 8L in a per se well-known manner, as set forth above. Thus, the vehicle is driven by the engine. A brake pedal 12 is provided to allow the driver decelerate and/or stop the vehicle while the vehicle is moving. The brake system also includes a parking brake arrangement with a manual parking brake lever or pedal 13.

In the shown embodiment, the power transmission 4 comprises an automatic transmission which may be coupled to a torque converter (not shown) and which operates in one of a number of discrete gear positions, e.g. FIRST gear position, SECOND gear position, DRIVE position, NEUTRAL position, REVERSE gear position and PARK position. If necessary, the automatic power transmission 4 may be connected to a control unit 1000 which controls shifting operations according to preset shift patterns related to vehicle speed, engine speed, engine load conditions and so forth. Normally, the automatic power transmission 4 is associated with a transmission gear selector 14 which allows the driver to select one of the aforementioned transmission gear positions. Control of the automatic power transmission by means of a microprocessor such as in the control unit 1000 is well known and requires no detailed description thereabout. However, for the sake of disclosure, the applicant hereby incorporates by reference U.S. patent application Ser. No. 678,886, filed Dec. 6, 1984 assigned to the same assignee as herein.

The controller or control unit 1000 is connected to the battery 15 through a connector line 16a to receive electrical power. A power source relay 17 is interposed in the connector line 16a, which relay 17 is coupled to the ignition switch to establish electrical communication between the battery 15 and the control unit 1000 when the ignition switch 10 is in either the IGN position or the START position. The control unit 1000 is also connected to the battery 15 via an auxiliary connector line 16b which continuously establishes electrical communication between the battery and the control unit. The battery power supplied through the auxiliary connector line 16b may serve as back-up power for maintaining data in memories in the control unit.

The ignition switch 10 produces a signal indicative of engine cranking while it is in the START position. The signal produced by the ignition switch 10 while the engine is cranking will be referred to hereafter as "starter signal". The starter signal of the ignition switch 10 is transmitted to the control unit 1000 via a line 18. The accelerator position is relayed to the control unit 1000 by the accelerator position sensor 33. The accelerator position sensor may comprise a known potentiometer and is connector to the control unit 1000 for input of the accelerator position signal via a line 19. The brake pedal 12 is associated with a brake switch 34 which produces a signal indicative of application of the brakes while the brake pedal is being depressed for decelerating or stopping the vehicle. The brake switch 34 is well-known and also energizes a brake lamp (not shown) while the brakes are operating. The brake switch 34 is connected to the control unit 1000 via a line 20 which supplies a signal indicative of application of brakes, which will be referred to hereafter as "brake signal". The parking brake 13 is also coupled with a parking brake switch 35 which closes in response to application of the parking brake 13 to produce a signal indicative thereof, which signal will be referred to hereafter as "parking brake signal". The parking brake signal is fed to the control unit 1000 via a line 21.

A transmission gear position sensor 36 disposed near the transmission gear selector 14 produces a signal indicative of the selected transmission gear position, which signal will be referred to hereafter as "gear position signal". The transmission gear position sensor 36 is connected to the control unit 1000 via a line 22. Though are not illustrated in FIG. 1, the control unit 1000 is also connected to a torque sensor 121 (FIG. 5) which monitors output torque on the crankshaft of the engine and produce a signal indicative of the crankshaft torque. The torque sensor 121 will be referred to hereafter as "crank-torque sensor" and the signal produced by the crank-torque sensor will be referred to hereafter as "crank-torque indicative signal". This torque sensor may be the sensor disclosed in the Japanese Patent Publication (Tokko) Showa No. 35-12447, for example. The contents of the Japanese Patent Publication Showa No. 35-12447 is hereby incorporated by reference.

The control unit 1000 is also connected to another torque sensor 141 which monitors torque on the transmission output shaft and produces a signal indicative of the transmission output shaft torque. The torque sensor 141 will be referred to hereafter as "output torque sensor" and the signal produced by the output torque sensor will be referred to hereafter as "output torque indicative signal". The transmission output shaft is provided with a revolution speed sensor 140 which produces a signal indicative of the revolution speed of the transmission output shaft. The sensor 140 will be referred to hereafter as "transmission output speed sensor" and the signal produced by the transmission output speed sensor will be referred to as "transmission output speed signal". The output torque sensor 141 and the transmission output speed sensor 140 are connected to the control unit 1000 via a data line 24.

An engine coolant temperature sensor 123, a crank angle sensor 120 and an intake air flow sensor 122 are also connected to the control unit 1000 via a data line 23. The coolant temperature sensor 123, the crank angle sensor 120 and the intake air flow sensor 122 will be described in more detail later with reference to FIG. 5.

A manual input unit 25 including a mode selector allows the driver to select the operation mode of the vehicular power train including the engine and the power transmission, from among an ECONOMY mode, a NORMAL mode and a POWER mode. The control processes of each of these modes will be described later. The input unit 25 is connected to the control unit 1000 via a data line 26. The control unit 1000 is further connected to a display unit 28 for display of various information, via a data line 27.

FIG. 4 schematically shows an electronically controlled internal combustion engine.

The electronic automotive engine control system generally comprises a control unit 1000. The control unit 1000 comprises a microprocessor and is associated with another microprocessor 2500 which serves as a vehicle information system. The engine control system 1000 includes various sensors and detectors such as an engine speed sensor, an air flow meter, and various temperature sensors, for providing control parameters, a control unit and actuators for controlling various engine operations such as fuel metering, idle air flow, and spark ignition timing. The engine control system further includes a fault monitor for detecting faults in the control system. The fault monitor checks the operation of the control unit and the inputs from the sensors. The results of the check operation in the fault monitor are conducted to a non-volatile memory 1450 which is associated with the engine control unit 1000. The vehicle information system in the shown embodiment is adapted to compute travelling distance, travelling time, average vehicle speed and so on in order to display information related to the current vehicle trip. The vehicle information system is associated with an external input unit 25 such as a keyboard and a display 28 for information display.

The data from the non-volatile memory 1450 is transferred to the vehicle information system via the fault monitor in the engine control unit 1000 and the data transmission line. The vehicle information system distinguishes which sensor or element of the control unit in the engine control system is malfunctioning. Based on the detection of the faulty element or sensor, the vehicle information system feeds a fault display signal to the display 28. Therefore, in response to the fault display signal and in accordance with the fault display signal value, the display 2520 indicates the faulty sensor or element and the degree of error thereof.

It should be appreciated that the fault monitor outputs data in response to the read command and holds the check program results until the next read command is received. In addition, the fault monitor connected in this manner to the vehicle information system according to the present invention is applicable not only to the foregoing engine control system but also to electronic control systems for automatic power transmission or for anti-skid control and so forth.

FIG. 4 illustrates the electronic engine control system, so-called Electronic Concentrated Control System (ECCS) for a 6-cylinder reciprocating engine known as a Datsun L-type engine. In the shown control system, fuel injection, spark ignition timing, exhaust gas recirculation rate and engine idling speed are all controlled. Fuel pressure is controlled by controlling fuel pump operation.

In FIG. 4, each of the engine cylinders 112 of an internal combustion engine 110 communicates with an air induction system generally referred to by reference numeral 220. The air induction system 220 comprises an air intake duct 121 with an air cleaner 124 for cleaning atmospheric air, an air flow meter serving as the intake air flow sensor 122, provided downstream of the air intake duct 121 to measure the amount of intake air flowing therethrough, a throttle chamber 128 in which is disposed a throttle valve 32 cooperatively coupled with an accelerator pedal (not shown) so as to adjust the flow of intake air, and an intake manifold 132. The air flow meter 122 comprises a flap member 125 and a rheostat 227. The flap member 125 is pivotably supported in the air intake passage 121 so that its angular position varies according to the air flow rate. Specifically, the flap member 125 rotates clockwise in FIG. 1 as the air flow rate increases. The rheostat 127 opposes the flap member 125 and generates an analog signal with a voltage level proportional to the intake air flow rate. The rheostat 127 is connected to an electrical power source and its resistance value is variable in correspondence to variation of the angular position of the flap member 125 depending in turn on variation of the air flow rate.

Though a flap-type air flow meter has been specifically illustrated, this can be replaced with any equivalent sensor, such as a hot wire sensor or a Karman vortex sensor, for example.

A throttle angle sensor 31 is associated with the throttle valve 32. The throttle angle sensor 231 comprises a full-throttle switch which is closed when the throttle valve is open beyond a given open angle and an idle switch which is closed when the throttle valve is open less than a minimum value.

A throttle switch of this type is illustrated in the European Patent First Publication No. 0058826, published on Sept. 1, 1982. The contents of this European First Publication is hereby incorporated by reference.

Fuel injection through the fuel injectors 134 is controlled by an electromagnetic actuator (not shown) incorporated in each fuel injector. The actuator is electrically operated by the fuel injection control system which determines fuel injection quantity, fuel injection timing and so on in correspondence to engine operating conditions determined on the basis of measured engine operation parameters such as engine load, engine speed and so on. The fuel injector 134 is connected to a fuel pump 137 through a fuel feed line including a pressure regulator 139. The fuel pump 137 is controlled by means of a fuel pump relay 135. If necessary, fuel pressure may be controlled in the manner described in the co-pending U.S. patent application Ser. No. 355,157, filed on Mar. 5, 1982, assigned to the same assignee as herein, now U.S. Pat. No. 4,497,300, which is a Continuation application of U.S. patent application Ser. No. 101,548 now abandoned, which corresponds to German Paten First Publication (DE-OS) No. 29 49 988.5, published on July 31, 1980. The contents the above-identified application is herein incorporated by reference. In the alternative, the fuel pressure may be controlled in the manner described in commonly-owned, co-pending U.S. patent application Ser. No. 655,554 filed on Sept. 28, 1984, now U.S. Pat. No. 4,577,604 and entitled CONTROL SYSTEM FOR FUEL PUMP FOR INTERNAL COMBUSTION ENGINE.

It should be noted that, although the fuel injector 134 is disposed in the intake manifold 132 in the shown embodiment, it is possible to locate it in the combustion chamber 112 in a per se well-known manner.

An idle air or an auxiliary air intake passage 144 is provided in the air induction system 121. One end 146 of the idle air intake passage 144 opens between the air flow meter 122 and the throttle valve 32 and the other end 148 opens downstream of the throttle valve 32, near the intake manifold 132. Thus the idle air intake passage 144 bypasses the throttle valve 32 and connects the upstream side of the throttle valve 32 to the intake manifold 132. An idle air control valve, generally referred to by reference numeral 150, is provided in the idle air intake passage 144. The idle air control valve 150 generally comprises two chambers 152 and 154 separated by a diaphragm 156. The idle air control valve 150 includes a poppet valve 158 disposed within a port 157 so as to be movable between two positions, one allowing communication between the upstream and downstream sides 143 and 145 of the idle air intake passage 144 and the other preventing communication therebetween. The idle air intake passage 144 is thus separated by the idle air control valve 150 into two regimes 143 and 145 respectively located upstream and downstream of the port 157 of the idle air control valve. The poppet valve 158 has a stem 160 which is secured to the diaphragm 156 so as to move therewith. The diaphragm 156 is biased downwards in the drawing, so as to displace the poppet valve 158 from a valve seat 162, by a helical compression coil spring 164 disposed within the chamber 152 of the valve means 150. Thereby, the idle air control valve 150 is normally opened, and normally connects the regimes 143 and 145 of the idle air intake passage 144 to one another, via its valve port 157.

The chamber 154 of the idle control valve 150 is open to the atmosphere. On the other hand, the chamber 152 of the idle air control valve 150 communicates through a vacuum passage 167 with a pressure regulating valve 168 serving as the control vacuum source. The pressure regulating valve 168 is separated generally into two chambers 166 and 170 by a diaphragm 172. The chamber 166 of the pressure regulating valve 168 also communicates with the downstream side of the throttle valve 32 through the vacuum passage 169 so as to reflect the level of the intake vacuum. The chamber 170 is open to the atmosphere in a per se well-known manner. To the diaphragm 172 is secured a valve member 176 which opposes a valve seat 178 provided at the end of the passage 169. The chambers 166 and 170 receive helical compression springs 171 and 173 respectively. The position at which the springs 171 and 173 balance each other is referred to as the neutral position of the diaphragm 172. It will be noted that the chamber 166 can also be connected to an exhaust gas recirculation (EGR) rate control valve 116 which recirculates a fraction of the exhaust gas from an exhaust gas passage and exhaust gas recirculation passage to the intake manifold 132.

The diaphragm 172 moves upwards or downwards according to changes in the balance between the vacuum in the chamber 166 and the atmospheric pressure introduced into the chamber 170. This movement of the diaphragm 172, moves the valve member 176 toward or away from the valve seat 178.

Another chamber 180 is also defined in the control valve 168, which chamber 180 communicates with the chamber 166 through a passage 182. The passage 182 is connected with the chamber 152 of the idle air control valve 150 through a control vacuum passage 184. On the other hand, the chamber 180 also communicates with the air intake passage 120 upstream of the throttle valve 32 through a passage 186 so as to be exposed to atmosphere. The chamber 180 is partitioned by a diaphragm 188 to which a magnetic valve member 190 is secured. The magnetic valve member 190 opposes a valve seat 192 formed at the end of the passage 182. Also, the magnetic valve member 190 opposes an electromagnetic actuator 294, the duty cycle of which is controlled by a control pulse signal generated by a control unit 1000. Depending on the amount of atmospheric pressure introduced into the passage 182 from the chamber 180, which is determined by the duty cycle of the electromagnetic actuator 194 which in turn is determined by the duty cycle of the control pulse signal, the control vacuum for controlling the opening degree of the valve member 158 of the idle air control valve 150 is regulated and supplied via the control vacuum passage 167.

Spark ignition plugs 199 are installed in each of the engine cylinders 112 to perform spark ignition at a controlled timing. Each ignition plug 199 is connected to a distributor 198 which receives high voltage power from an ignition coil 196. The distributor 198 is controlled by a spark advancer which advances or retards the spark ignition timing depending on engine operating conditions.

An exhaust system for the engine exhaust gas comprises an exhaust manifold 200, an exhaust duct 202, an exhaust gas purifier 204, a muffler 206 and a exhaust vent 208. The exhaust manifold 200 opens toward the engine cylinders to draw engine exhaust gas therefrom. The exhaust duct 202 communicates with the exhaust manifold 200 and includes the exhaust gas purifier 204 and the muffler 206. In the shown embodiment, the exhaust gas purifier 204 comprises a purifier housing 310 and a three-way catalytic converter 212 disposed within the purifier housing 310. The three-way catalytic converter 212 oxidizes monoxide carbon CO and hydrocarbons HC and reduces oxides of nitrogen $NO_x$.

An exhaust gas recirculation passage 214, which will be referred to hereafter as the EGR passage, is connected to the exhaust duct 202 upstream of the exhaust gas purifier 204. The EGR passage 214 communicates with the intake manifold 132 via an exhaust gas recirculation rate control valve 216 which will be referred as the EGR control valve. The EGR control valve 216 generally comprises a valve member 218 with a valve seat 120 form in the end of the EGR passage 214 adjacent the intake manifold 132. The valve member 218 is associated with a vacuum actuator 222 and is cooperatively connected to a diaphragm 224 of the vacuum actuator 222 via a stem 226. The diaphragm 224 divides the interior of the vacuum actuator 122 into two chambers 228 and 230. The chamber 228 communicates with the EGR passage 214 via a passage 232 and the chamber 230 communicates with the regulating valve 168 via a control vacuum passage 234. A set spring 233 for biasing the diaphragm 224 is disposed within chamber 230. The control vacuum passage 234 is connected to a passage 236 connecting the vacuum chamber 166 to a chamber 238. One end of the passage 236 faces a valve member 240 secured to a diaphragm 242. A valve seat 243 is formed in the end of passage 236 to allow the valve member 240 to selectably seal passage 136. The valve member 240 has a stem 244 projecting into an electromagnetic actuator 146.

The duty cycle of the electromagnetic actuator 246 is controlled to move the valve member 240 with respect to the valve seat 243 in response to a control signal generated by a controller to be described later. According to the instantaneous position of the valve member 240, intake air is admitted to the passage 236 via the passage 186 at a controlled rate. The intake air admitted into the passage 236 is mixed with the intake vacuum admitted from intake passage 120 downstream of the throttle valve 32 via the vacuum induction passage 169 into the vacuum chamber 166, so as to produce the control vacuum. The control vacuum thus produced is conducted to the chamber 230 of the actuator 222 via the control vacuum passage 234 to control the operation of the EGR control valve 216. Thereby, the exhaust gas is admitted into the intake manifold at a controlled rate.

An air regulator 250 is provided near the throttle chamber 128 for regulating the intake air flowing through the throttle chamber. Also, a carbon canister 252 is provided. The carbon canister 252 retains hydrocarbon vapor until the canister is purged by air via the purge line 254 to the intake manifold when the engine is running. When the engine is idling, the purge control valve 256 is closed. Only a small amount of purge air flows into the intake manifold through the constant purge orifice. As the engine speed increases, and the ported vacuum becomes stronger, the purge control valve 256 opens and the vapor is drawn into the intake manifold through both the fixed orifice and the constant purge orifice. The carbon canister 252 can trap hydrocarbons due to the chemical action of the charcoal therein.

Figure 4A:
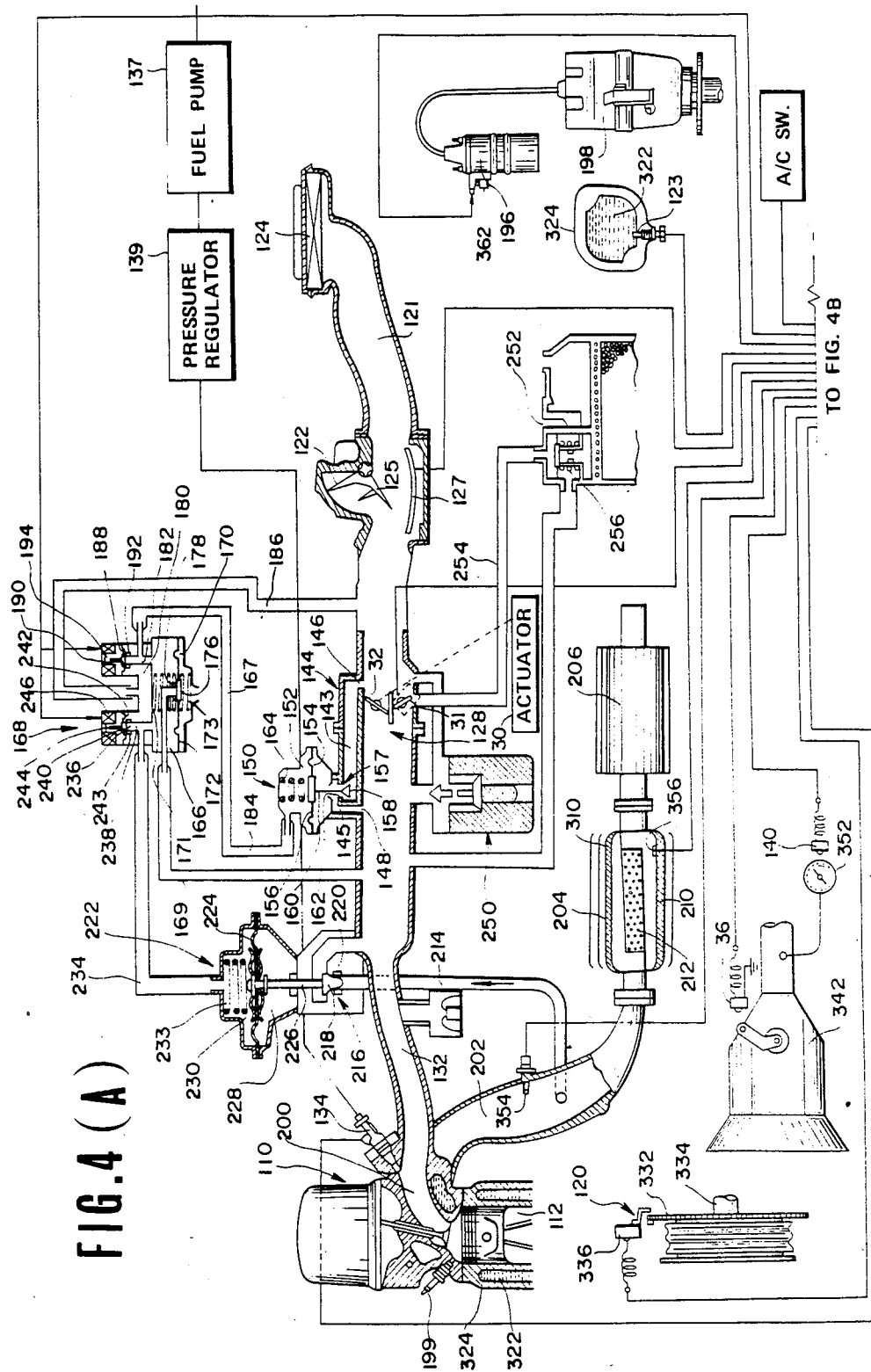
FIGS. 4(A) and 4(B) together form a diagram of an engine control system to which the preferred embodiment of the throttle valve control system is applicable.
Figure 4B:
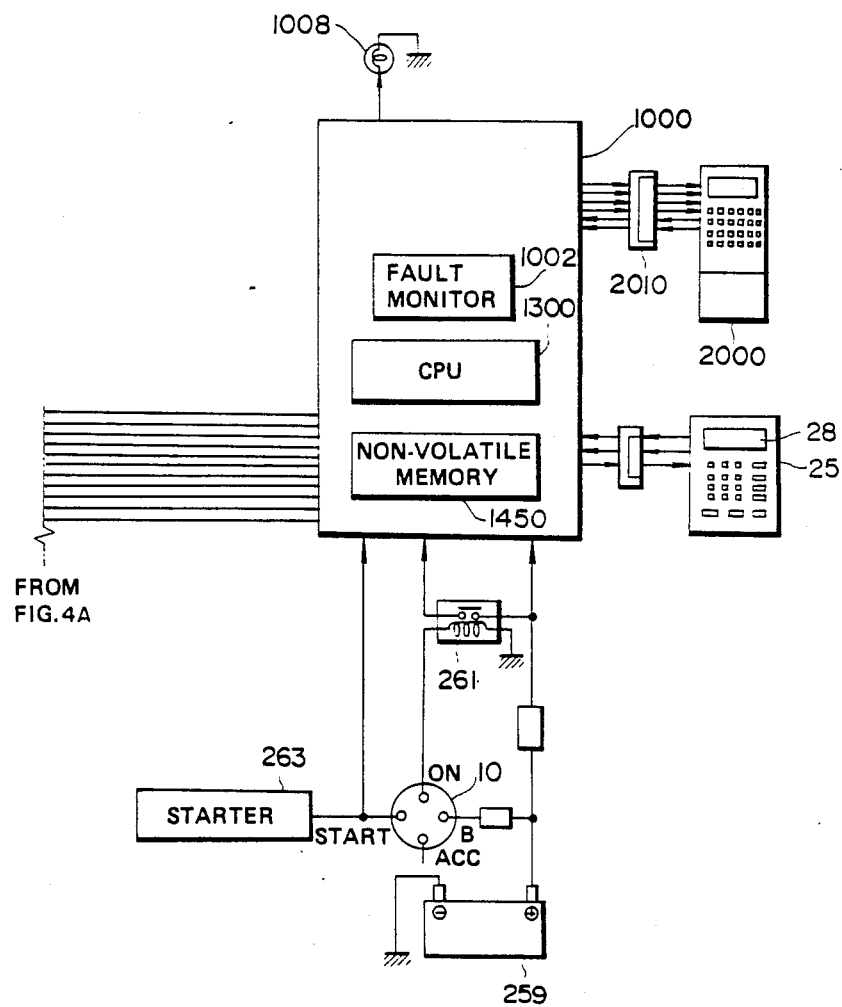

As shown in FIG. 4B, the control unit 1000 generally comprises a microcomputer and controls a fuel injection system, a spark ignition system, an EGR system and engine idling speed. The control unit 1000 is connected to an engine coolant temperature sensor 123. The engine coolant temperature sensor 123 is usually disposed within a coolant chamber 322 in an engine cylinder block 324 in order to measure the engine coolant temperature. The engine coolant temperature sensor 123 produces an engine coolant temperature signal indicative of the measured engine coolant temperature. The engine coolant temperature signal is an analog signal with a voltage value proportional to the determined engine coolant temperature and is converted into a digital signal.

Generally speaking, the engine coolant temperature sensor 123 comprises a thermistor fitted onto a thermostat housing 326 provided in the coolant circulation circuit.

A crank angle sensor 120 is also connected to the control unit 1000. The crank angle sensor 120 generally comprises a signal disc 332 secured to a crank shaft 334 for rotation therewith, and an electromagnetic pick-up 336. The crank angle sensor 120 produces a crank reference angle signal and a crank position angle signal. As is well known, the crank reference angle signal is produced when the engine piston reaches the top dead center and the crank position angle signal is produced per a given unit of crank rotation, e.g., per 1 degree of crank rotation.

If necessary, a special type of crank angle sensor such as is disclosed in the co-pending U.S. patent application Ser. No. 445,552, filed on Nov. 30, 1982 and assigned to the same assignee as herein, now U.S. Pat. No. 4,562,817, can be used. The contents of the above-identified co-pending U.S. patent application are hereby incorporated for the sake of disclosure. Also, if necessary, a timing calculation system described in the European Patent First Publication No. 00 85 909, published on Aug. 17, 1983 and the back-up system described in the European Patent First Publication No. 00 81 648 are applicable to the shown engine control system. The contents of these European Patent First Publications are hereby incorporated by reference for the sake of disclosure.

A transmission gear position sensor 36 is connected to the control unit 1000 as described previously. The transmission gear position sensor 36 is secured to the transmission 4 to detect gear position of the transmission.

An exhaust gas temperature sensor 356 is installed in the exhaust gas purifier housing 310. The exhaust gas temperature sensor 356 monitors the exhaust gas temperature and produces an analog signal as an exhaust gas temperature signal, the voltage of which is proportional to the exhaust gas temperature. The exhaust gas temperature signal is supplied to the control unit 1000.

In addition, an exhaust gas sensor 354 such as an oxygen sensor, hereafter referred to simply as the $O_2$ sensor 354, is installed in the exhaust duct 202 upstream of the opening of the EGR passage 214. The $O_2$ sensor 354 monitors the concentration of oxygen in the exhaust gas. The output of the $O_2$ sensor goes high when the determined oxygen concentration indicates an air/fuel ratio in excess of stoichiometry, or of a suitable selected air/fuel ratio value, and remains low otherwise. The output of the $O_2$ sensor is inputted to the control unit 1000 via the multiplexer 305 and the analog-digital converter 306 as a λ-signal.

In addition, the air flow meter 122 is connected to the control unit 1000. The rheostat 127 of the air flow meter 122 outputs an analog signal with a voltage proportional to the intake air flow rate. The throttle angle sensor 31 is also connected to the control unit 1000 to supply the outputs of the full-throttle switch and the idle switch.

As shown in block form in FIG. 4B, the control unit 1000 is also connected with an air-conditioner switch 360, a ignition switch 10, and a battery voltage sensor 364. The air-conditioner switch 360 is closed when the air conditioner is operating. Also, the ignition switch 10 produces the starter signal when the starter is operating. The battery voltage sensor 364 monitors the vehicle battery voltage and outputs a signal with a voltage proportional to the determined battery voltage to the control unit 1000.

In the shown embodiment, the control unit 1000 controls the fuel injection amount and timing, the spark ignition timing, the EGR rate and the engine idling speed.

The $O_2$ sensor signal from the $O_2$ sensor 354 is used to control the fuel injection quantity under stable engine conditions as determined with reference to the engine speed, the throttle valve angle position detected by the throttle angle sensor 31, the vehicle speed and so on. Under stable engine conditions, the fuel injection quantity is feedback controlled on the basis of the $O_2$ sensor signal so that the air/fuel ratio can be controlled to the stoichiometric value. This method of fuel injection control is called λ-control. If the engine is running under unstable conditions, the fuel injection quantity is generally determined on the basis of engine speed and intake air flow rate, the latter of which can be replaced by intake vacuum pressure downstream of the throttle valve. Under unstable engine conditions, the basic fuel injection quantity determined on the basis of engine speed and air flow rate is corrected according to other parameters such as air-conditioner switch position, transmission gear position, engine coolant temperature and so on.

The spark ignition timing is generally controlled on the basis of engine speed, air flow rate, engine coolant temperature and so on, which effect to varying degrees the advance and retard of the spark advance.

The EGR control is effected on the basis of engine speed, engine coolant temperature, ignition switch position and battery voltage. The recirculation rate of the exhaust gas is derived from the engine speed and a basic fuel injection quantity determined according to engine speed and engine load. The duty cycle of the EGR control valve is thus controlled in accordance with the determined recirculation rate.

The idle engine speed is controlled predominantly on the basis of engine coolant temperature and engine load condition. Under relatively cold engine conditions, the engine speed is maintained at a predetermined value, determined with reference to the engine coolant temperature, resulting in fast idle operation. In the normal temperature range, the engine speed is feedback-controlled on the basis of the difference between the actual engine speed and a reference engine speed determined on the basis of engine temperature, engine load condition and other parameters.

As shown in FIG. 4A and 4B, the control unit 1000 also includes a fault monitor 1002. In practice, the fault monitor 1002 is a program stored in memory and executed by a central processing unit (CPU) 1300. The controller 1000 is connectable with an external check unit 2000 via a check connector 2010. The check unit 2000 signals the controller 1000 to make the fault monitor operative in order to check a series of check items identified by inputs. This external check unit 2000 has been described in Japanese Patent Prepublication No. 56-141534 published Nov. 5, 1981. The contents of this Prepublication are hereby incorporated by reference. The controller 1000 is also connected to the vehicle information system via a connector.

The fault monitor 1002 of the controller 1000 is connected to a fault indicator 1008. The fault monitor 1002 produces a fault signal when an error occurs in any one of the check items. The fault indicator turns on in response to the fault signal to indicate malfunction of the engine control system. The fault monitor 1002 is associated with the non-volatile memory 1450 described previously. Upon execution of the check program, check data from a series of check items are stored in the non-volatile memory 1450. When the fault indicator 1008 is turned on, the input unit 25 of the vehicle information system generates and outputs the read request command to the engine control system in order to read the check data out of the non-volatile memory 1450. On the basis of the retrieved check data, the vehicle information system feeds the fault display signal to the display 28 in order to identify the specific faulty element and error condition on the display.

FIG. 5 summarizes the inputs and outputs of the preferred embodiment of the control system according to the present invention. As will be apparent from FIG. 5, the control unit 1000 is connected to the ignition switch 10, the transmission gear position sensor 36, the accelerator position sensor 33, the brake switch 34, the parking brake switch 35, the crank angle sensor 120, the air flow meter 122 and engine coolant temperature sensor 123 to receive therefrom the starter signal, the gear position signal, the accelerator position signal, the brake signal, the parking brake signal, a crank reference signal and crank position signal, an intake air flow rate signal and an engine coolant temperature signal. The controller 1000 is also connected to the crank torque sensor 121, the output torque sensor 141 and the transmission output speed sensor 140 to receive therefrom the crank-torque indicative signal, the output torque indicative signal and the transmission output speed signal. The controller 1000 is further connected to the input unit 25 which allows manual input of various data including mode selection data. The operation pattern of the power train including the engine and the transmission are adjusted according to the mode selection data. In the shown embodiment, the operation mode can be selected from among POWER mode, NORMAL mode and ECONOMY mode. This variable mode operation and selection from among various modes have been disclosed, in Japanese Patent First Publication (Tokko) Showa No. 58-13140. The contents of this Japanese Patent First Publication are hereby incorporated by reference for the sake of disclosure.

The controller 1000 is also connected to the power source 15 both directly and via the power source relay 17.

The controller 1000 controls operation of the power source relay 17 by means of a power source relay control signal. The power source relay control signal is an ON/OFF signal which energizes and deenergizes the relay 17. The controller 1000 is responsive to the IGN and START ignition switch positions to output an ON signal to energize the relay 17. Therefore, whenever the ignition switch 10 is in the IGN or START position, the main power supply is connected to energize the controller. Otherwise, i.e. whenever the ignition switch is in the ACC position, OFF position or LOCK position at which vehicular steering is locked for the purpose of theft prevention, only the auxiliary power supply is connected to the controller 1000 in order to preserve the contents of the memories of the controller.

The controller 1000 also outputs a data output signal to the display 28. The data transmitted to the display 28 may include operational mode data, gear position data and forth. The data may also include the results of diagnosis of the power train control system. One example of this data output has been disclosed in the foregoing Japanese Patent First Publication (Tokko) Showa No. 58-13140. The contents of this Japanese Patent First Publication are hereby incorporated by reference.

Intake air flow control is also performed by the controller 1000 in response to the accelerator position indicative signal from the accelerator position sensor 33. The air flow control signal is fed to the throttle actuator 30 which is discussed, in Japanese Patent First Publication (Tokko) Showa No. 58-25853. The contents of this Japanese Patent First Publication are hereby incorporated by reference.

In the intake air flow control, the controller 1000 is responsive to the accelerator position signal to produce an air flow control signal which is representative of a desired opening degree of the throttle valve 32 to be realized by the throttle valve actuator 30. In general, the opening degree of the throttle valve 32 corresponds to the depression degree of the accelerator pedal 11 as represented by the accelerator position signal. A response lag between input of the accelerator signal and output of the air flow control signal results partially from the fact that the rate of change in throttle opening degree is limited to a standard or normal rate when NORMAL operation mode is selected. Therefore, in this case, the acceleration and deceleration characteristics of the engine are at a standard or normal level of responsive to changes in the position of the accelerator pedal. When ECONOMY operation mode is selected, the rate of change of the throttle valve opening degree is slower than that in the NORMAL mode. This slower change of throttle valve open degree reduces the chance of acceleration enrichment as part of fuel injection control and thus reduces overall fuel consumption.

In the POWER mode, the rate of change in throttle opening degree is greater than in NORMAL mode. Therefore, response of the throttle valve open angle to accelerator operation is enhanced, allowing the driver to enjoy sharp acceleration and deceleration characteristics.

During engine idling or coasting, the air flow control signal controls the throttle valve open angle via the throttle actuator 30 so as to hold the engine idling speed constant in a manner as described in the Japanese Patent First Publication No. 55-160137. The contents of this Japanese Patent First Publication are hereby incorporated by reference. On the other hand, when an automatic cruise control system is in operation for adjusting engine speed or output speed of the power train so as to hold the vehicle speed at a preset cruise speed, the controller 1000 derives the air flow control signal value on the basis of the difference of the measured vehicle speed and the set speed. Such automatic cruise control systems have been disclosed in U.S. Pat. Nos. 4,434,469, 4,394,739 and 4,451,690. The contents of the foregoing prior publications reciting the automatic cruise control systems are hereby incorporated by reference.

Furthermore, the control unit 1000 performs engine output torque dependent throttle valve control in accordance with the preferred procedure according to the preferred embodiment of the present invention. The details of the torque dependent intake air flow control will be discussed later.

Figure 6:
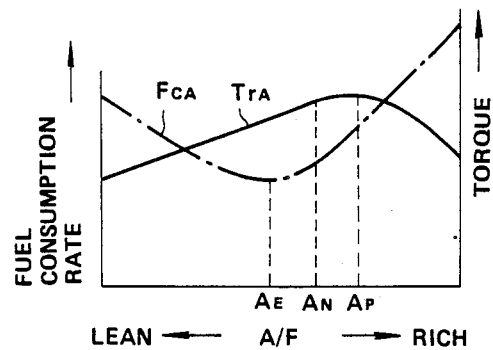
FIG. 6 shows how output torque and fuel consumption rate of an engine vary with respect to air/fuel ratio.

The fuel injection control signal is a pulse signal which controls the opening time of a fuel injection valve mounted on the engine and is delivered from the control unit 1000 via the wire harness 23. As described in Japanese Opening Patent Application No. 55-125334 which is hereby incorporated by reference for the sake of disclosure, the basic control concept is that the above-mentioned valve opening time duration (fuel injection amount), which is proportional to the intake air flow rate, is computed on the basis of the crank position signal and the air flow signal, and then this result is corrected in various ways, and the result is output in terms of the fuel injection control signal synchronously with the operation of the engine 3. While in NORMAL mode, the fuel injection amount-related information reflected by the fuel injection control signal are such as to attain the air fuel ratio indicated by $A_N$ in FIG. 6. In the POWER mode and the ECONOMY mode, the information reflected by the fuel injection control signal differs as will be described with reference to FIG. 6 which shows how output torque $T_{rA}$ and fuel consumption rate $F_{cA}$ vary with respect to air fuel ratio (A/F). In the POWER mode, the fuel injection amount indicated by the fuel injection control signal provides an air fuel ratio as indicated by $A_p$ at which the output torque $T_{rA}$ is maximized. The fuel injection control signal for this mode is obtained by multiplying the basic fuel injection valve opening duration by a certain value or adding a certain value to the basic fuel injection valve opening duration. In the ECONOMY mode, the fuel injection amount indicated by the fuel injection control signal results in an air fuel ratio indicated by $A_E$ at which the fuel consumption rate $F_{cA}$ is minimized. The fuel injection control signal for this mode is derived by reducing the basic fuel injection valve opening duration by a correction coefficient.

As described in Japanese Laid Open Patent Applications Nos. 57-185501 and 54-58165, the contents of which are hereby incorporated by reference, the ignition control signal controls the ignition energy and the ignition timing by controlling synchronously with the crank reference signal, the time during which current is allowed to pass through a primary coil of an ignition coil and the termination timing of the current supply. This signal is delivered from the control unit 1000 via the wire harness 23. The ignition energy is controlled so as to remain constant despite variations in the engine revolution speed (the cycle or the frequency of the crank position signal) and in the voltage of the battery 15, and the ignition timing is determined on the basis of the engine revolution speed and crankshaft torque taking the output torque, fuel economy and exhaust gases into account. Referring to how the ignition timing is determined, since the ignition timing is set to an optimal point where the torque is maximized and the fuel consumption rate is minimized, this means that it is not necessary to alter the ignition timing despite possible changes in mode. However, the proper ignition timing at which the torque is maximized and the fuel consumption rate is minimized shifts also in response to the aforementioned alteration of the fuel injection control signal and the air flow control signal, and, as will be later described, of an EGR control signal, a transmission gear position control signal, and a lock-up control signal as a result of mode change. Thus, it is necessary for the ignition timing be adjusted accordingly. Toward this end, one measure is to prepare a plurality of tables of the ignition timings corresponding in number to the number of selectable modes and one table which corresponds to the selected mode is selected and used in computing the ignition timing which is to be indicated by the ignition control signal 222. Alternatively, the basic ignition timing values in a table may be uniformly corrected in response to a mode instructed so as to derive the proper ignition timing signal for the mode.

Figure 7:
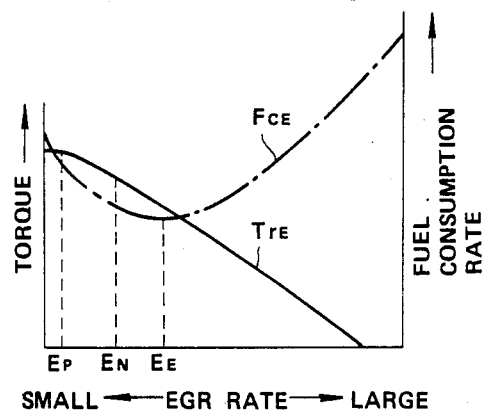
FIG. 7 shows how output torque and fuel consumption vary with respect to EGR rate.

As described in Japanese Laid Open Patent Application No. 55-32918, the contents of which are hereby incorporated by reference, the EGR control signal carries information related to the opening degree an an exhaust gas recirculation valve (exhaust gas recirculation rate), which signal is delivered from the control unit 1000 via the wire harness 23. In the above-mentioned NORMAL mode, the above-mentioned valve opening degree, i.e., the exhaust gas recirculation amount (an exhaust gas recirculation rate), is determined on the basis of engine revolution speed and crankshaft torque, taking into account the exhaust composition and the fuel economy so that an exhaust gas recirculation rate as indicated by $E_N$ in FIG. 7 is obtained. The information indicated by the EGR control signal differs in the POWER mode and the ECONOMY mode, as will be described with reference to FIG. 7 which illustrates how the output torque $T_{rE}$ of the engine and the fuel consumption rate $F_{cE}$ vary with respect to the exhaust gas recirculation (EGR) rate. In the POWER mode, the EGR control signal reflects an EGR rate $E_p$ at which the torque $T_{rE}$ is maximized, whereas in the ECONOMY mode, it provides an EGR rate at which the fuel consumption rate $F_{cE}$ is minimized. The alteration of the EGR control signal $S_{EGR}$ in response to a switch between modes may be carried out by means of a plurality of tables corresponding in number to the modes.

Figure 8:
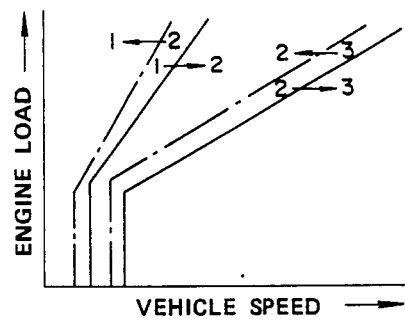
FIGS. 8(A), 8(B) and 8(C) show optimal shift patterns for an ECONOMY mode, a NORMAL mode and a POWER mode, respectively.
Figure 8:
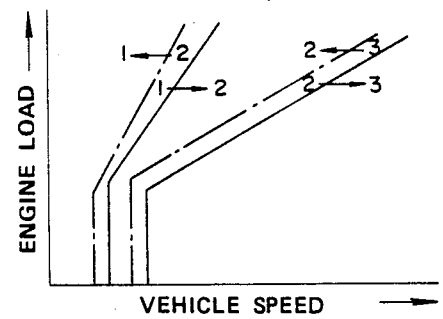
Figure 8:
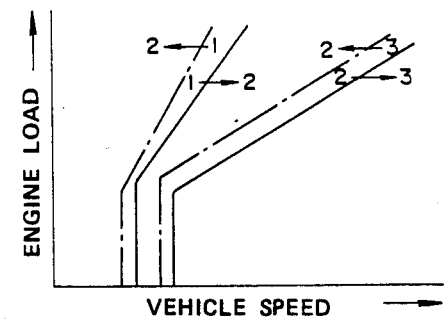

The transmission gear position control signal relays information related to a desired reduction ratio (gear position) for the transmission 4 and is delivered from the control unit 1000 via the wire harness 24 to a well-known gear select actuator 402. The reduction ratio is determined on the basis of the input torque to the transmission (the engine crankshaft torque), and the vehicle speed (output shaft revolution speed signal) taking the driving torque, fuel economy vibrations into account. As described in Japanese Laid Open Patent Applications Nos. 57-47056, 56-24255 and 56-24256, the contents of which are hereby incorporated by reference, the transmission gear position control signal controls various gear shift solenoids of the transmission 4 in order to establish the desired gear position. In more detail, the information to be encoded in the transmission gear position control signal $S_{tr}$ is derived from various gear position tables (gear shift patterns) as shown in FIGS. 8(a), 8(b) and 8(c). The table illustrated in FIG. 8(a) is for use in the ECONOMY mode, the table illustrated in FIG. 8(b) for the NORMAL mode, and the table illustrated in FIG. 8(c) for the POWER mode. As will be understood from the shift pattern schedules shown in these Figures, the shift lines 1-2, 2-3, 3-2 and 2-1 move toward the high vehicle speed end of the scale from FIG. 8(a) toward FIG. 8(c) via FIG. 8(b) so that there a growing tendency for the lower gear positions to be maintained until a higher vehicle speed is attained. Thus, the shift pattern in FIG. 8(a) emphasizes fuel economy, the shift pattern illustrated in FIG. 8(c) emphasizes power performance and the shift pattern shown in FIG. 8(b) exhibits characteristics intermediate to the others.

Figure 9:
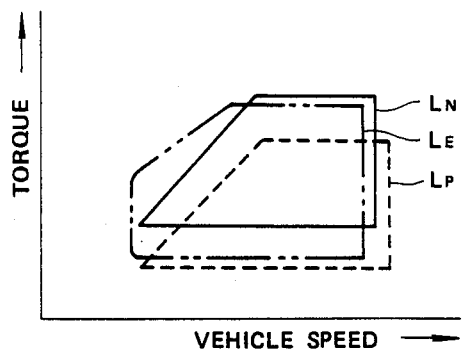
FIG. 9 shows optimal lock-up ranges for the ECONOMY mode, the NORMAL mode and the POWER mode of FIG. 8.

The lock-up control signal, which controls connection and disconnection of the input and output elements of the torque converter in the transmission 4, is delivered from the control unit 1000 via the wire harness 24 to a conventional lock-up actuator 404. As described in Japanese Laid Open Patent Applications Nos. 56-24255, 56-24256 and 57-33253, the lock-up control signal is determined on the basis of the crankshaft torque and the vehicle speed taking the fuel economy and vehicle vibrations into account. The contents of the aforementioned three Japanese publications are hereby incorporated by reference. As shown in FIG. 9 for example, in the NORMAL mode, lock-up of the torque converter owing to the above connection is intended to take place in an operating range enclosed by the solid line $L_N$, lock-up is intended to take place in a lock-up range enclosed by the broken line $L_P$ in POWER mode, and lock-up is to take place in a lock-up range enclosed by the two-dot chain line $L_E$ in ECONOMY mode. The lock-up range for the NORMAL mode covers the range in which no substantial vehicle vibrations during acceleration and deceleration will occur. The lock-up range for the POWER mode covers a range narrower than the lock-up range for the NORMAL mode, but which, in order to utilize the torque multiplication function for enhanced acceleration, covers the range in which lock-up is required for effective engine braking.

The lock-up range for ECONOMY mode covers a range sufficiently wide to the extent that no substantial vibrations take place at acceleration and deceleration. The lock-up control signal controls the relative rotation (the slip) between the input and output elements by controlling the connection and disconnection within the torque converter as mentioned preveiously, thus allowing the torque converter to operate in the state best suited for the selected mode.

Figure 10:
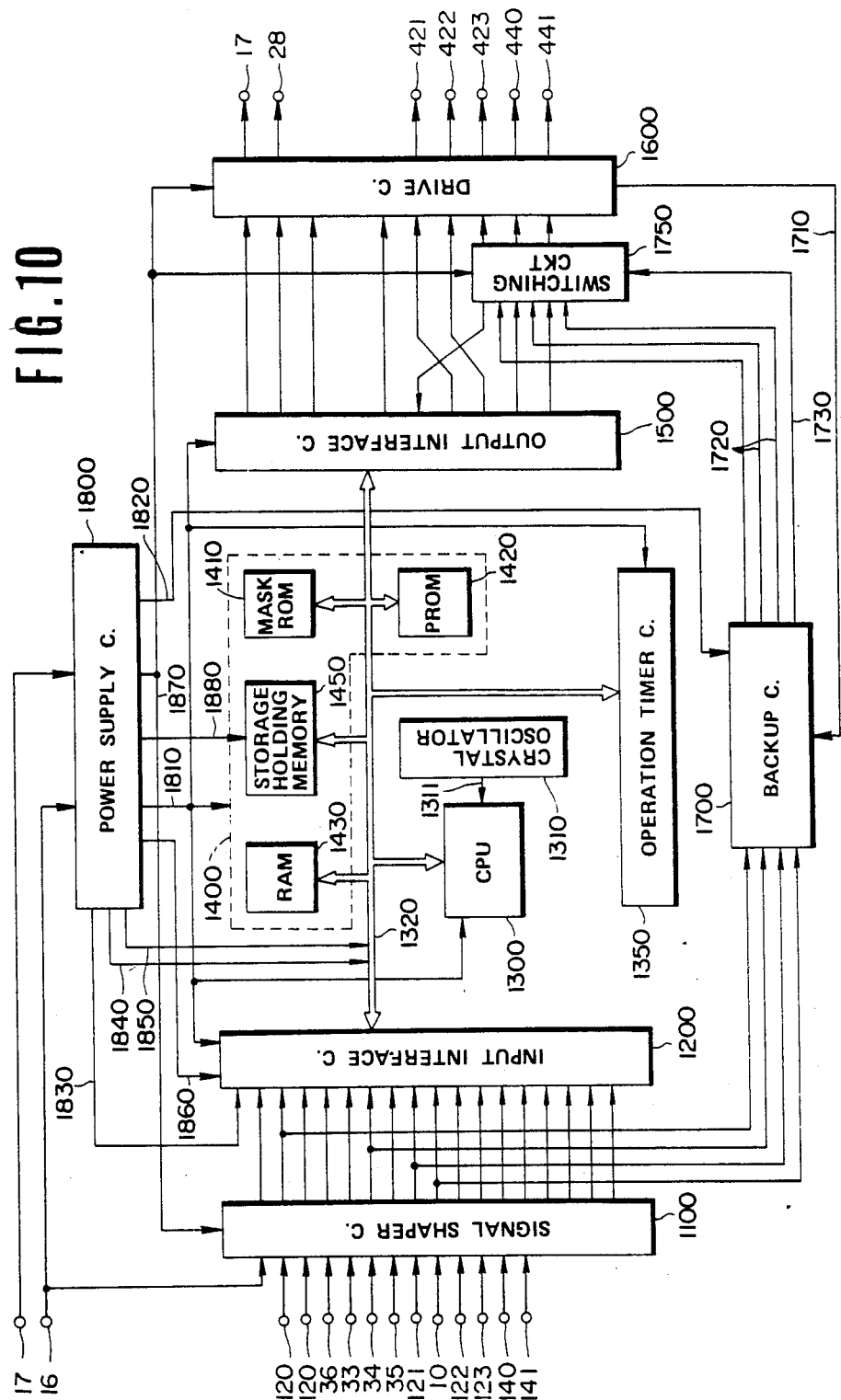
FIG. 10 is a detailed block diagram of a control unit in the throttle valve control system according to the invention.

FIG. 10 shows the detailed structure of the control unit or controller 1000. A shaping circuit 1100 is connected to the input side of an input interface 1200 of a microprocessor which constitutes the control unit. The shaping circuit receives the crank reference signal and the crank position signal from the crank angle sensor 120, the transmission gear position signal from the transmission gear position sensor 36, the accelerator position signal from the accelerator position sensor 33, the brake signal from the brake switch 34, the parking brake signal from the parking brake switch 35, crank-torque signal from the crank-torque sensor 121, the ignition switch position signal including the starter signal, the intake air flow rate signal, the engine coolant temperature signal from the engine coolant temperature sensor 123, the output torque signal from the output torque sensor 141 and the transmission output speed signal from the transmission output speed sensor 140. Also, manual input data including the mode selection data from the input unit 25 is input to the shaping circuit 1100. The shaping circuit serves to eliminate noise from the input signals and absorb surges thereof so as to prevent malfunction of the control unit 1000 due to the noise and spikes, and also amplifies and converts the input signals so as to make them compatible with an input interface 1200.

The input interface 1200 performs analog-to-digital conversion of all analog input signals such as the air flow rate signal, the accelerator position signal and so forth. The input interface 1200 also counts frequency pulses for a predetermined time in order to convert these signals into digital coded signals which can be read as input data by a central processing unit (CPU) 1300 and stores them into corresponding internal registers.

The CPU 1300 operates in discrete, uniform time units specified by a clock signal derived from an oscillating signal generated by a crystal oscillator 1310. The CPU 1300 is connected via a bus 1320 to the input interface circuit 1200, a memory 1400, an output interface circuit 1500 and an operation timer circuit 1350. When in operation, it executes a control program stored in a mask ROM 1410 and a PROM 1420 of the memory 1400, reads various input data from the corresponding registers within the input interface circuit 1200, performs arithmetic operations on these input data to generate various output data, and delivers these output data to the corresponding registers within the output interface circuit 1500. The memory 1400 is a storage device including in addition to the above mentioned mask ROM 1410 and the PROM 1420, a RAM 1430 and a storage holding memory 1450. The mask ROM 1410 is used to permanently store control programs and data used in executing the programs. The PROM 1420 is used to permanently store vehicle speed values, control programs which are subject to alteration depending upon the make and model of the engine 3 and the transmission, which data are written into the PROM 1420 when the latter is installed in the control system. The RAM 1430 is a random access memory which is freely eraseable and updateable and used to temporarily store intermediate results of arithmetic operations performed by the CPU 1300, and temporarily store the final data resulting from the arithmetic operations executed by the CPU 1300 before they are delivered to the output interface circuit 1500. The storage contents immediately disappear when the main power source 107 is disconnected when the ignition switch 10 is turned OFF. The storage holding memory 1450 is used to store data such as those intermediate data and final data of the arithmetic operations executed by the CPU 1300 which are to be retained even after the automotive vehicle stops running, and it can hold the above mentioned data owing to a continuous connection to the power source 108 even after the main power source 107 is disconnected when the ignition switch 10 is turned OFF.

The operation timer circuit 1350 is provided to enhance the capabilities of the CPU 1300. It comprises a multiplication circuit for speeding processing in the CPU 1300, an interval timer for causing an interrupt signal upon elapse of a predetermined time and a free-running counter used to measure elapsed time for triggering shifts between successive events and recording the timing of such events. The output interface circuit 1500 stores the output data from the CPU 1300 in corresponding internal registers. It converts these data into pulse signals or into binary switching signals before delivering them to a drive circuit 1600. The drive circuit 1600 is a power amplifier circuit which performs voltage or current amplification of the signals from the output interface circuit 1500 so as to produce the various output signals.

Designated by 1700 is a backup circuit which is activated by a monitor signal 1710 caused by monitoring the signals produced by the drive circuit 1600. When it is activated indicating that the CPU 1300 or the memory 1400 has failed to operate normally, the backup circuit 1700 receives some of the signals from the signal shaper circuit 1100 and generates output signals 1720 which enables the engine 3 and the transmission 4 to continue to operate so as to allow the automotive vehicle to continue running and also a switching signal 1730 indicating the occurrence of a problem. The signals 1720 and 1730 are supplied to a switching circuit 1750, causing the switching circuit 1750 to cut off signals from the output interface circuit 1500 and supply in lieu thereof the signals 1720 from the backup circuit 1700 to the drive circuit 1600, thereby to enable the automotive vehicle to run safely at least as far as an auto repair shop. Note that these elements serve as the fault monitor of FIG. 5.

Designated by 1800 is a power source circuit which is supplied with the main power source 17 and the continuously connected power source 16. The power source circuit 1800 supplies a constant voltage of 5 V along a line 1810 from the main power source 17 to the input interface circuit 1200, CPU 1300, memory 1400, output interface circuit 1500 and operation timer circuit 1350. It also supplies another constant voltage of 5 V along a line 1820 to the backup circuit 1700, a signal along line 1830 indicative of "ON" or "OFF" state of the ignition switch 10 to the input interface circuit 1200, a reset signal along line 1840 and a stop signal along line 1850 for temporarily preventing the CPU 1300 from accessing the bus 1320, a constant voltage along line 1860 for the internal A/D converter to the input interface circuit 1200, and a main voltage along line 1870 to the signal shaper circuit 1100, drive circuit 1600 and switching circuit 1750. In addition, the power source circuit 1800 supplies a constant voltage of 5 V along a line 1880 from the continuously connected power source 16 to the storage holding memory 1440 for enabling same to operate even after the ignition switch 10 has been turned OFF.

Figure 11:
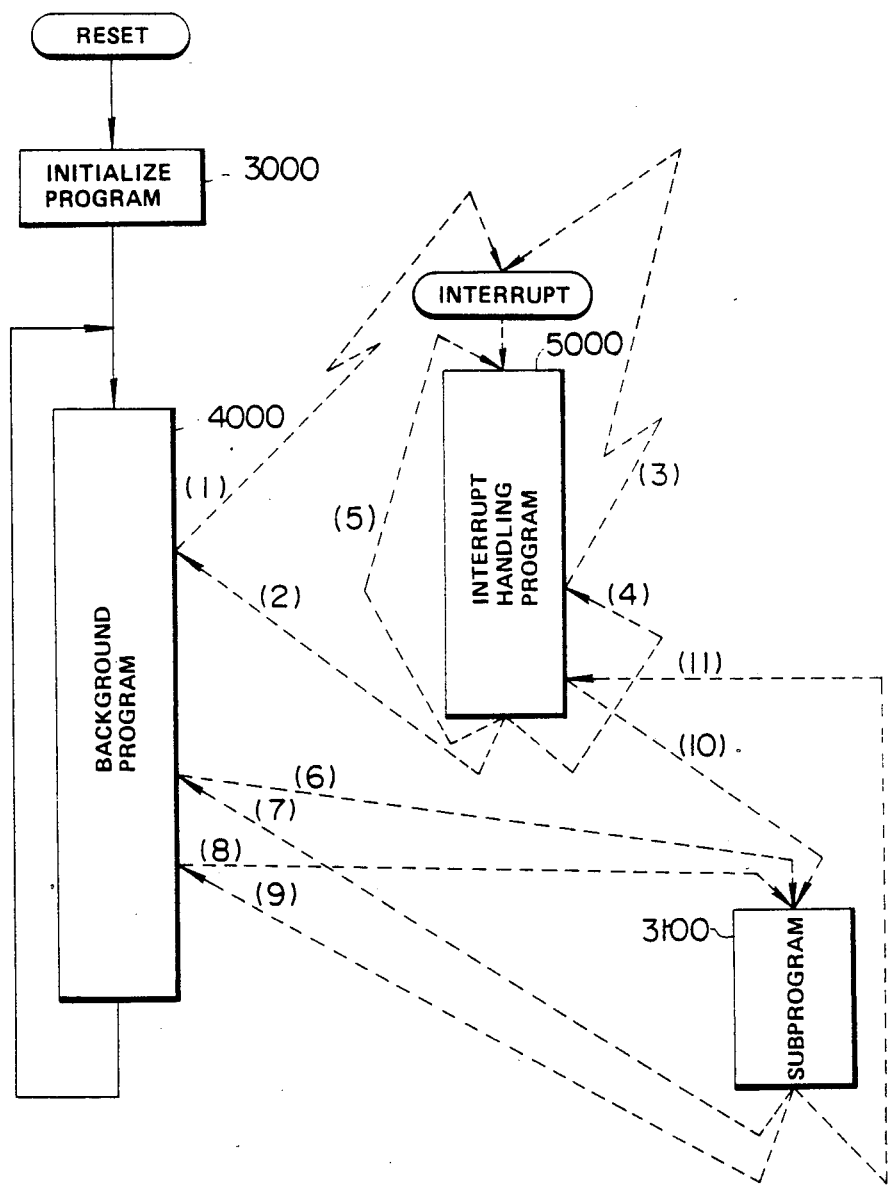
FIG. 11 is a diagram illustrating the control concepts the control unit of FIG. 10.

Referring to FIG. 11, control programs for the control unit and their execution will be described in general terms.

The control programs comprise and can be generally divided into four groups, namely an initialize program 3000, a background program group 4000, an interrupt handling program group 5000 and a subprogram group 3100.

When the ignition switch 10 is turned ON and thus the main power source 17 is connected, the reset signal along line 1840 is generated by the power source circuit 1800, causing the control programs to start running from the point RESET in FIG. 11. First, the initialize program 3000 is caused to run so as to set initial values in the RAM 1430, and input and output interface circuits 1200, 1500 (initialization). After the initialization, the execution of the background program 4000 is started and repeated. This program group comprises a plurality of programs and these programs are caused to run sequentially in the order of priority. Receipt of an interruption signal causes execution of the background program 4000 to be interrupted, as represented by the broken arrow (1) leading to the interrupt handling program group 5000 which begins with INTERRUPT. (Although not so in this embodiment, interruption of the initialize program 3000 is also possible if desired.)

After identifying the cause of the interrupt signal, the program group 5000 selects one of a plurality of programs corresponding to the idenfitied cause and causes the selected program to run. After execution of the selected program, control returns to the point of interruption of the background program group 4000, as indicated by the broken arrow (2), from which point the background program resumes.

If a second interrupt signal is received during execution of the interrupt handling program group 5000, control goes again to INTERRUPT as indicated by the broken arrow (3), and a comparison is made between the priorities of the interrupt handling program being executed and the interrupt handling program corresponding to the new interrupt signal so as to decide which one should be executed first. In response to the results of this comparison, one possibility is that the new interrupt signal causes switching to the new program corresponding to the new interrupt signal as indicated by the broken line arrow (4) and after execution of this new program, the original interrupt program is resumed. Another possibility is that after executing the first program, control passes directly to the new program corresponding to the new interrupt signal as indicated by the broken line arrow (5).

Among the plurality of programs belonging to the background program group 4000 and the plurality of programs belonging to the interrupt handling program group 5000, those which are most frequently used are may be segregated into a subprogram group 3100. During execution of a program belonging to the background program group 4000 or the interrupt handling program group 5000, if the need for one of the above-mentioned subprograms should arise, control passes to that subprogram 3100 as indicated by the broken line arrows (6), (8), (10), and after execution of this program control returns immediately to the same point of the original program as indicated by the broken line arrows (7), (9), (11). Although it is of course possible to interrupt execution of a subprogram, this is not illustrated here for the sake of clarity.

If interruption of a program would cause a problem, response to interrupts can be inhibited until the end of the program.

Figure 12A:
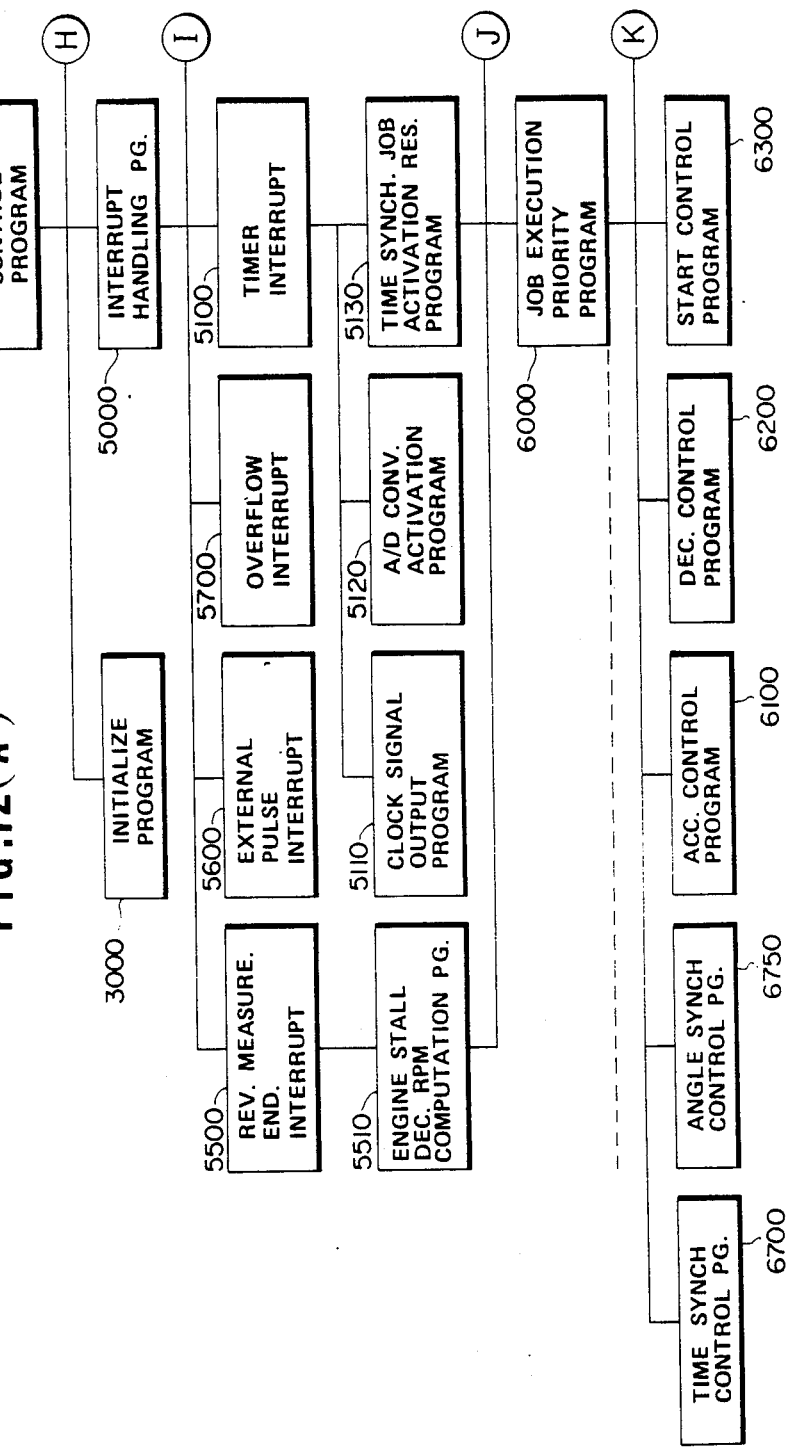
FIGS. 12(A) and 12(B), when combined, illustrate in detail the control relationship among programs stored in the control unit.
Figure 12B:
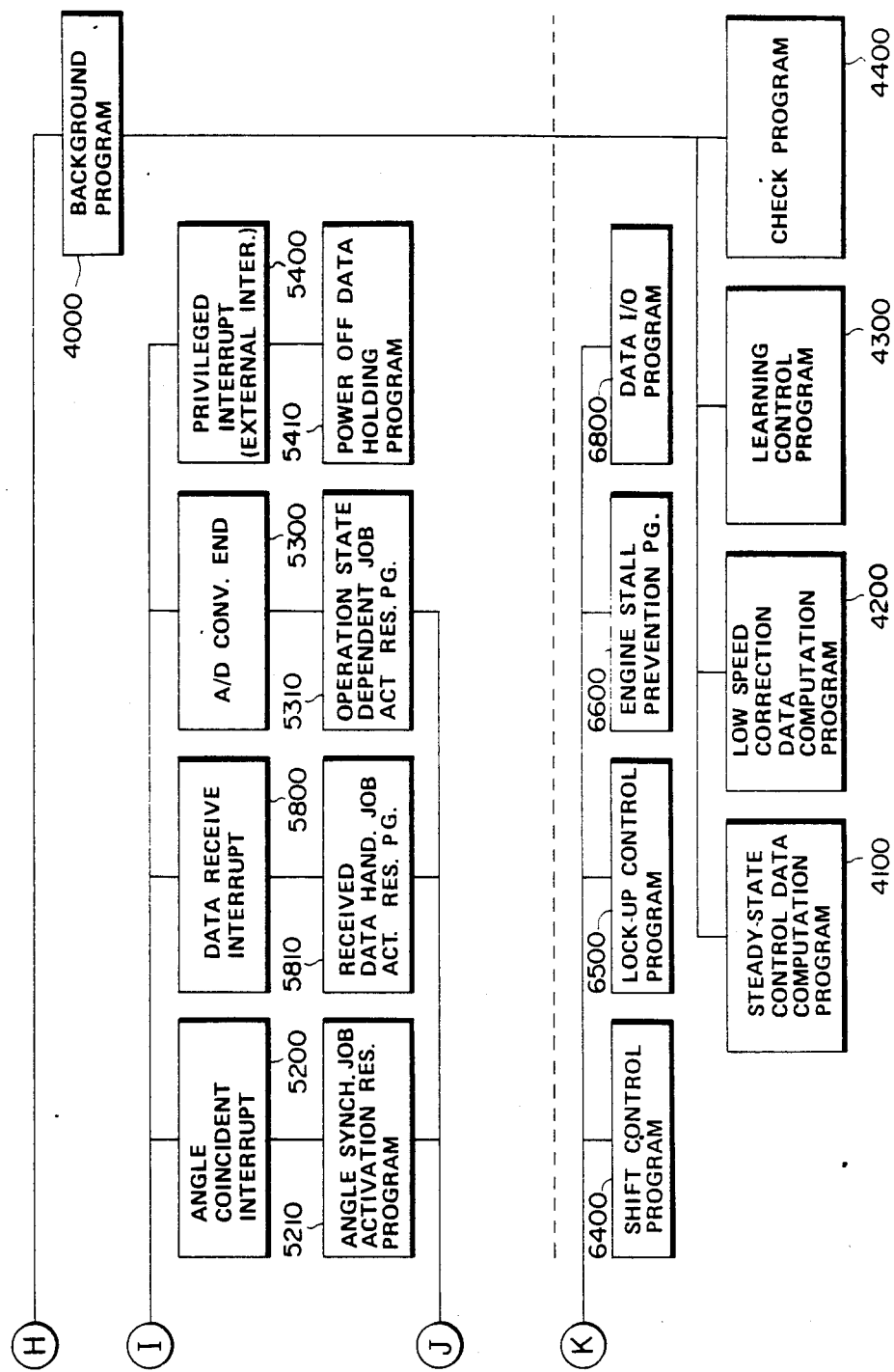

The control programs listed in FIGS. 12A and 12B which will be referred to hereinafter in a detail description of the control programs.

When the ignition switch 10 is turned ON and the main power source 17 is connected, the reset signal along line 1840 is generated, causing the initialize program 3000 to run from a specified address called "reset vector address." The initialize program 3000 is executed to prepare for execution of various programs which follow by setting initial values in the CPU 1300, RAM 1430, and input/output interface circuits 1200, 1500 (initializing). This program clears all of the locations in the RAM available to this microcomputer and generates all of the instructions necessary to initiate operation of the input and output interface circuits 1200, 1500 and the operation timer circuit 1350. These instructions include an instruction to release an instruction mask for handling interruption signals, an instruction to set a frequency timer interrupt, an instruction to set a measuring time various revolution speeds and the vehicle speed are to be measured, and an instruction to set an initial state of each of the output registers. After initialization, an instruction enabling interrupts is issued to the CPU 1300.

The execution of the background program 4000 continues during the normal operation of the CPU 1300, i.e., as long as there are no interrupt requests. The background program group 4000 consists of jobs which are of low urgency such as jobs requiring long operation time or jobs computing steady-state control constants. The background program group 4000 includes a steady-state control data computation program 4100, a low speed correction data computation program 4200, a learning control program 4300 and a check program 4400. These programs are executed sequentially in a predetermined order so that the top program is executed again after execution of the bottom program and this cycle is repeated. In this manner, the control unit 1000 continuously generates output signals during steady state operation of the automotive vehicle.

The interrupt handling program group 5000 starts running after interrupting of the execution of the background program group 4000 (or the initialize program 3000 if desired). The interrupt handling program group 5000 comprises a timer interrupt handling program 5100 (5110, 5120, 5130) an angle coincident interrupt handling program 5200 (5210), an A/D conversion handling program 5300 (5310), an external interrupt (or a privileged interrupt) handling program 5400 (5410), a revolution measurement end interrupt handling program 5500 (5510), an external pulse interrupt handling program 5600, an overflow interrupt handling program 5700, and a data receive interrupt handling program 5800 (5810) which are all triggered by the corresponding interrupt requests. It also includes a group of programs sequenced on the basis of priorities decided by a job execution priority decision program 6000, which group of programs includes an acceleration control program 6100, a deceleration control program 6200, a start control program 6300, a shift control program 6400, a lock-up control program 6500, an engine stall prevention program 6600, a time synchronizing control program 6700, an angle synchronizing control program 6750 and a data input/output program 6800.

Describing these programs subsequently, entry of a timer interrupt causes a selection of the timer interruption program 5100 where the A/D conversion activation program 5120 is executed. This program 5120 manages the measurement of analog input signals by activating the A/D converter and operating the multiplexer to perform A/D conversion of the analog input signals for use in the subsequent control cycle. Then, the clock signal output program 5110 is executed. This program generates a clock signal with a predetermined period which indicates normal operation of the CPU 1300, memory 1400, and output interface circuit 1500. Finally, time synchronizing job activation reservation program 5130 is executed and places an activation request for a time synchronizing control program 6700 in the job execution priority program 6000. The time synchronizing control program processes which jobs are to be carried out synchronously with the clock signal.

Receipt of an angle coincidence interruption request (i.e., an interrupt which occurs whenever the engine assumes a predetermined crank angle) causes the selection of the angle coincident interruption handling program 5200. This program causes an angle synchronizing job activation reservation program 5210 to place an activation request for a job handling program (an angle synchronizing control program 6750) which needs to be processed synchronously with the revolution of the engine on the job execution priority decision program 6000.

Receipt of an A/D BUSSY flag check interrupt causes selection of the A/D conversion end handling program 5300 where a decision is made after checking the A/D BUSSY flag whether or not the A/D conversion has When been completed. If it is done, an operation state dependent job activation reservation program 5310 orders the storage of A/D converted data into the corresponding locations in RAM 1430 in accordance with A/D conversion channel data, and although this will be specifically described later, it the operating state of the automotive vehicle on the basis of the behavior of the most recent values of the acceleration position signal and places an activation request for an appropriate operation state dependent job handling program for this operating state (such as the acceleration control program, deceleration control program and start control program) on the job execution priority decision program 6000.

Receipt of an external interrupt request triggers execution of the external interrupt handling program 5400. The external interrupt, i.e., an emergency interrupt, is generated when the main power source 17 is disconnected. This program 5400 executes a power off data holding program 5410 in which data to be preserved for learning control and the like are moved from the RAM 1430 to the storage holding memory 1450.

Receipt of an engine revolution measurement end interrupt request trigger execution of the revolution measurement end interrupt handling program 5500. This program activates an engine stall decision RPM computation program 5510 in which engine revolution speed is read to decide whether or not the engine may stall, and an activation request for an engine stall prevention control program 6600 is placed on the job execution priority program queue if the engine may stall.

The external pulse interrupt handling program 5600 triggered by manipulation of a key on a key board or receipt of a pulse signal from an external device. This program causes execution of a control program corresponding to the pulse signal. The overflow interruption handling program 5700 is triggered by receipt of an interupt generated upon overflow of the timer and performs a predetermined process.

The data reception interrupt handling program 5800 is triggered by receipt of a data receive interrupt request and causes the execution of the received data handling job activation program 5810. This program 5810 stores the received data at a predetermined location in the RAM 1430 and places an activation request for the received data handling job on the job execution priority program queue.

The job execution priority decision program 6000 accepts the various activation requests for job handling programs selected by the above mentioned interrupt handling programs and causes the contents of bits (flags) in the RAM 1430 corresponding to the selected job programs to go from "0" to "1". A predetermined execution priority level is initially allocated to each job program and the sequence of bit locations representing the job programs is set up in accordance with the predetermined priority levels. In the case of this program, a check is made starting with the high-order bit and proceding toward the low-order bit in an area of the RAM 1430, and when activation of a program has been requested, this program is executed and the request indicator is cancelled (by resetting the corresponding flag to "0"). When the execution of this program ends, the job execution priority decision program 6000 is executed and the requested program at the next priority level is executed and the request therefor is cancelled, and after execution of all of the requested programs has been completed, control returns to the background program 4000.

Hereinafter, a group of those job programs which are to be executed in order of priority determined by the program 6000 are described. The acceleration control program 6100 computes output control data relating to optimal fuel injection amount, ignition timing, exhaust gas recirculation flow rate, intake air flow rate, reduction ratio and lock-up schedule for the degree of acceleration. For example, in the case of a rapid acceleration (i.e., in the case of rapid increase in the accelerator position signal), they are controlled so as to increase the output of the engine, in that the fuel injection amount is increased, the ignition timing is advanced, the EGR flow rate is reduced and the intake air flow rate is increased, and in addition, in order to increase the output torque from the transmission 4, the torque converter is released from lock-up and the reduction ratio is increased.

A deceleration control program 6200 computes, during deceleration, various control output data which are optimal for the detected rate of deceleration, vehicle speed and engine revolution speed. During deceleration, the engine 3 is controlled so that the fuel injection amount is zero or very small and the transmission 4 is controlled such that the reduction ratio and the operating state of the torque converter cooperate with each other to provide the most appropriate rate of deceleration.

The start control program 6300 computes various output data for controlling the engine 3 and the transmission 4 so that a sufficiently great starting torque can be obtained when starting the automotive vehicle without allowing the driving wheels 2L, 2R to slip.

The shift control program 6400 computes various output data used for controlling the gear selection in the transmission 4 and the output torque and the revolution speed of the engine 3 in order to prevent significant shocks from being transmitted to vehicle passengers during gear shifting in the transmission 4.

The lock-up control program 6500 computes various output data for controlling lock-up operation of the torque converter and the output of the engine in order to reduce shocks occurring upon lock-up and subsequent release.

The engine stall prevention control program 6600 is triggered when it is anticipated that the engine stall may occur by recognizing a state of excessive variation of the engine revolution speed during execution of said program 5510. It computes various control output data so as to control the engine 3 and the transmission 4 in such a way as to prevent the engine from stalling by increasing the engine output immediately and decreasing the load.

The time synchronizing control program 6700 which is requested and executed at the end of each cycle, updates various data and writes the control data of the preceding cycle into the output interface circuit 1500.

The execution of an angle synchronizing program 6750, which is requested and executed whenever the engine 3 assumes a predetermined crank angle, updates various data and writes control data into the output interface circuit 1500.

The data input/output control program 6800, which is requested and executed upon lapse of a predetermined time or upon entry of a data receive interrupt, stores the received data after identifying the contents, alters the state of control and outputs the data.

The operation of the above described embodiment is described taking as a representative example the case where the driver manipulates the data input device 25 and selects a different operating mode. When the mode changes, the interrupt handling program 5000 receives a data receive interrupt request and selects the data receive interrupt program 5800. This program 5800 triggers the received data handling job activation reservation program 5810 and stores the selected mode, i.e., the NORMAL mode, POWER mode or ECONOMY mode, in a predetermined location in the RAM 1430 and places a request for activation of the received data (selected mode) related job in the job execution priority decision program 6000. Upon receiving the request for activation of the job, the program 6000 sets a predetermined bit (flag) of a predetermined location in the RAM 1430 corresponding to this job from "0" state to "1" state. The program 6000 causes the execution of the data input/output program 6800 and at the same time resets the flag to "0". The data input/output program 6800 issues instructions enabling other routines to properly generate the air flow control signal, fuel injection control signal, ignition timing signal, EGR control signal and lock-up control signal.

Subsequently, after control has returned to the background program 4000, the steady-state control data computation program 4100, low speed correction data computation program 4200, learning program 4300 and check program 4400 are executed based on the above mentioned instructions, thus controlling the engine 3 and the transmission 4 in accordance with the driver's instructions.

If the data input device 25 is unable to generate the data receive interrupt signal, the functions of the programs 5800 (5810) may be included in the timer interruption handling program 5100. In this case, receipt of a timer interrupt causes the control unit 1000 to instruct the data input device 25 to transmit a value indicative of the selected mode. This selected mode indicative value triggers the data input/output program 6800 as described previously. Although the above example has been described in connection with three different modes, i.e., the NORMAL mode, the POWER mode and the ECONOMY mode, it is possible to carry out the invention in the case where there are more than three modes. Where there are more than three selectable modes, it would be convenient to select the mode by means of numerical values generated by a single switch rather than using a number of switches corresponding to the modes. In additions, the change between modes may be made more smooth only with more fine fractionalization. It is also possible to effect a continuous transition between modes in response to an output generated by a potentiometer. Of course, the above mentioned mode transition must be carried out within the restraints imposed with regard of noise, vibrations and exhaust gas regulations.

Figure 13:
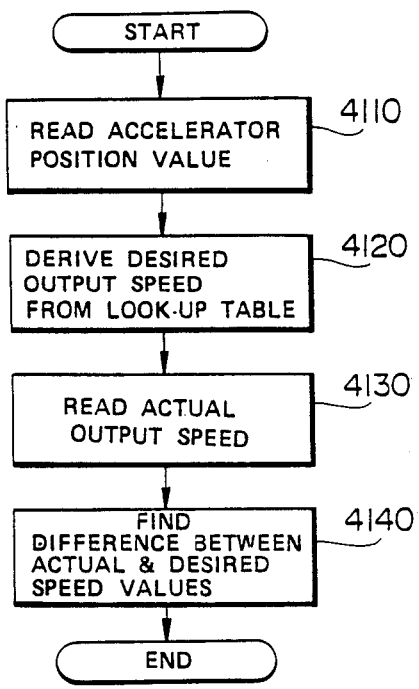
FIG. 13 is a flowchart of a correction value derivation program executed by the control unit of FIG. 10.
Figure 14:
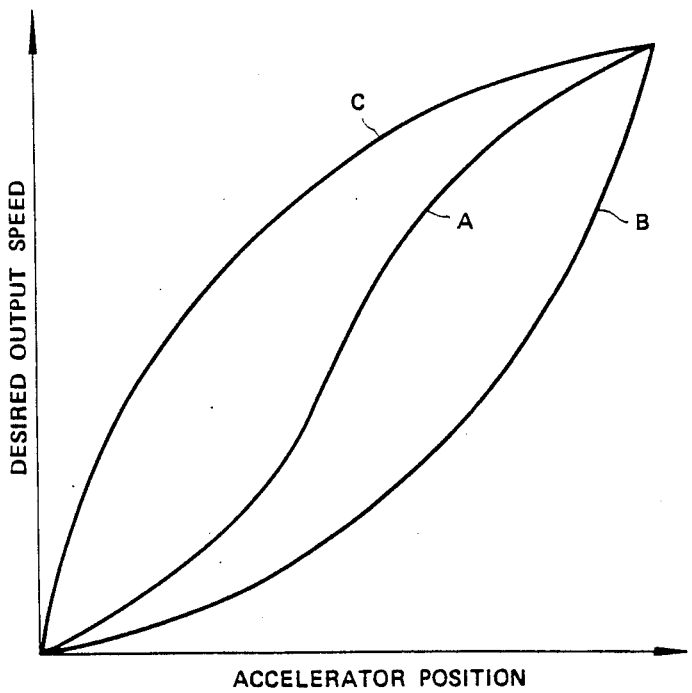
FIG. 14 is a graph of the output torque demand in terms of accelerator pedal position.
Figure 15:
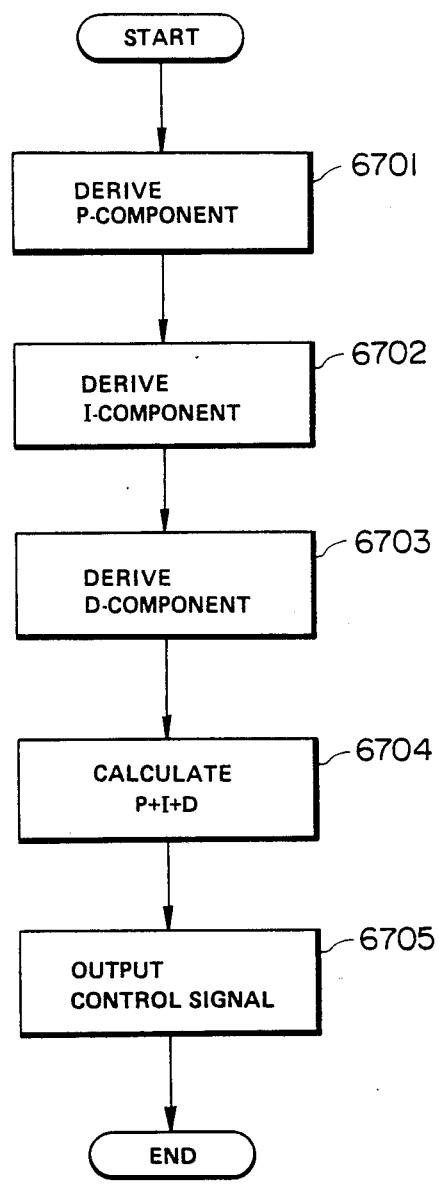
FIG. 15 is a flowchart of a throttle valve CLOSED LOOP control program according to the present invention.

Referring to FIGS. 13 to 15, the preferred control procedure for the throttle valve angular position in the preferred embodiment of the throttle valve control system in accordance with the present invention will be described in detail.

FIG. 13 illustrates a program for deriving a correction value used in output torque dependent throttle valve control. This program is included in the aforementioned steady-state control data computation program 4100 of the background program group 4000. Immediate after starting to execute the correction value deriving program, the accelerator position indicative signal value is read out at a step 4110. On the basis of the accelerator position indicative signal value retrieved in the step 4110, a table look-up is performed with respect to a table illustrated in FIG. 14 and stored in PROM 1420 of FIG. 10. For the values shown in FIG. 14, the output torque demand values relative to the accelerator pedal position were obtained experimentally and stored in a form of a data table in PROM 1420. The torque demand variation characteristics in terms of the accelerator pedal position vary depending upon the selected operation mode as represented by the three curves A, B and C. Mode dependent variation of the derivation of the torque demand will be discussed in more detail later with respect to FIG. 16.

In the program shown in FIG. 13, the characteristic curve A in FIG. 14 is used to derive the torque demand in terms of the accelerator pedal position in NORMAL mode. The table look-up in terms of the accelerator position indicative signal value is performed at a step 4120 of FIG. 13. Then, the actual output torque indicative signal value is read out at a block 4130. The value of the output speed indicative signal of the output speed sensor 140 represents the actual output speed produced by the engine through the power transmission. The difference between the desired output torque value derived at the step 4120 and the actual output torque read in the step 4130 is calculated at a step 4140. The difference between the desired and actual output speed values may be temporarily stored in an appropriate register or memory block in RAM 1430. Then, the correction value deriving program ends.

On the basis of the difference value derived during execution of the correction value deriving program, a throttle valve position control signal value derived by a throttle valve control program of FIG. 15 is corrected by the same control program. This throttle valve control program constitutes a part of the time synchronizing control program 6700. The throttle valve control program of FIG. 15 is a feedback or CLOSED LOOP control program performing known PID control for deriving the control signal value.

Therefore, after starting the control program of FIG. 15, a proportional component P of the difference value derived by the program of FIG. 13, is calculated at a step 6701. An integral component I is calculated value is calculated at a step 6702. Thereafter, a differential component D of the difference value, is calculated at a step 6703. The proportional component P, the integral component I and the differential component D thus obtained are summed at a step 6704 to obtain a sum value (P+I+D). At a step 6705, a throttle valve position control signal having a value corresponding to the sum value as obtained in the block 6704 is produced. Therefore, the sum value (P+I+D) serves as a feedback control value for adjusting the throttle valve angular position. At the step 6705, the throttle valve position control signal is output to the throttle valve actuator 32 for operating the latter at a magnitude corresponding to the control signal value. By adjusting the throttle valve angular position by the feedback control signal, the intake air flow rate can be adjusted to be increased or decreased depending upon the difference of the torque demand and the actul output speed so as to reduce the difference therebetween to zero.

Therefore, by utilizing the accelerator pedal position indicative signal as a parameter defining a demanded output torque, accelerator response can be improved significantly and deviation of the accelerator depression magnitude and the output speed, which degrades drivability, is successfully avoided. For instance, even when the environment condition of the engine changes, output speed can uniformly correspond to the magnitude of depression of the accelerator pedal.

FIG. 16 shows a modification of the aforementioned correction value deriving program of FIG. 13. In this program, mode selection is used as a parameter for deriving the feedback control signal value. For instance, depending on the selected mode, i.e. NORMAL mode, ECONOMY mode or POWER mode, output speed demand is adjusted as illustrated in FIG. 14 by the lines A, B and C.

In the program of FIG. 16, similarly to the program of FIG. 13, the accelerator position indicative signal value is read out at the step 4110. Thereafter, a mode selector signal from the input unit 25 is read out, at a step 4121. Based on the mode selector signal, the output speed demand characteristic curve to be used is selected from among the aforementioned three curves, at a step 4122. When the ECONOMY mode is selected, table look-up with respect to the characteristics B of FIG. 14 is performed in terms of the accelerator position signal value, at a step 4123. When NORMAL mode is selected, then the characteristic curve A of FIG. 14 is used to derive the speed demand. Therefore, table look-up is performed with respect to the characteristic curve A of FIG. 14, in terms of the accelerator position signal value, at a block 4124. Similarly, when the POWER mode is selected, the characteristic curve C of FIG. 14 is used in the speed dependent throttle valve control. In this case, table look-up with respect to the characteristic curve C in terms of the accelerator position indicative signal is performed at a step 4125.

As in the program of FIG. 13, the value of the output torque indicative signal from the output torque sensor 141 is read out at the step 4130. Then, the difference between the torque demand and the actual output speed is calculated at the step 4140.

According to the shown modification, when fuel economy is to be stressed, the ECONOMY mode is selected through the input unit. As will be seen from FIG. 14, when the characteristic curve B is used, the demand torque magnitude, especially in the range of relatively small depressions of the accelerator pedal, is relatively small. Therefore, less air flow and less fuel supply is required than in the POWER mode or NORMAL mode. On the other hand, when the good engine output performance is required, the POWER mode may be selected. In this mode, the rate of change of demand speed with respect to the accelerator position is rather great, thus increasing the demand speed at a higher rate. This tendency is especially remarkable in the range of relatively small depressions of the accelerator pedal. Therefore, better acceleration and deceleration characteristics can be obtained than in the ECONOMY mode and NORMAL mode. In the NORMAL mode, the acceleration and deceleration characteristics fall between those of the ECONOMY mode and POWER mode and fuel consumption is greater than in ECONOMY mode but smaller than in POWER mode. The NORMAL mode is thus considered to provide standard engine output characteristics for each specific engine.

While the specific preferred procedure for feedback controlling the throttle valve angular position has been disclosed hereabove in terms of the preferred embodiment of the invention, the invention should not be limited to the specific procedure illustrated but can be embodied in many ways without departing from the principle of the invention.

What is claimed is:

1. An intake flow rate control system for an internal combustion engine comprising:

a manually operable speed demand input means for producing a speed demand indicative signal having a value varying according to preset variation characteristics in accordance with manual operation;

a manually operable mode selector for selecting one of various distinct variation characteristics of the speed demand, and wherein said speed demand indicative signal value varies dependinq upon the selected mode;

a first sensor, associated with a vehicular power train including said engine, for monitoring the actual output speed of said power train and producing an actual speed indicative signal having a value proportional to the output speed of the power train;

an intake air flow rate adjusting means, associated with an air induction passage of the engine, for controlling air flow therethrough, said intake air flow rate adjusting means being responsive to a control signal to adjust the intake air flow rate in accordance therewith; and a controller receiving said speed demand indicative signal and said actual speed indicative signal and deriving the difference between the signal values thereof, said controller producing said control signal having a value corresponding to the derived difference and thereby controlling said intake air flow rate adjusting means to adjust the actual output speed of said power train toward the manually input speed demand.

2. The control system as set forth in claim 1, wherein said speed demand input means comprises a manually operable accelerator serving as a movable element of an accelerator position signal generator producing said speed demand indicative signal according to the manually selected position of said accelerator.

3. The control system as set forth in claim 2, wherein said intake air flow rate adjusting means comprises a throttle valve disposed within said air induction passage and an electrically operable servo system associated with said throttle valve for adjusting the open degree of said throttle valve according to said control signal.

4. An air induction rate control system for an internal combustion engine comprising:
a manually operable accelerator for controlling air induction rate through an air induction passage;
a manually operable mode selector switch movable to any of a plurality of switch positions, each corresponding to a preset operational mode;
a throttle valve disposed pivotably within said air induction passage, the angular position of which depends upon the manually selected position of said accelerator;
a first sensor associated with said accelerator for producing a first sensor signal having a value varying according to the position of the accelerator; wherein speed demand characteristics relative to said first sensor signal value are adjusted in accordance with the selected operational mode;
a second sensor monitoring output of a power train including said engine and producing a second sensor signal having a value indicative of the output speed of said power train;
a third arithmetic means, responsive to said first sensor signal for deriving an output speed demand on the basis of said first sensor signal value, said third arithmetic means is responsive to the switch position of said mode selector switch for selecting one of preset speed demand characteristics corresponding to the selected mode, and derives the speed demand in terms of said first sensor signal value in accordance with the selected characteristics;
a fourth arithmetic means, responsive to said second sensor signal and the output of said first arithmetic means, for deriving the difference between said second sensor signal value and said first arithmetic means output value and deriving a control signal having a value corresponding to the derived difference between the second sensor signal value and said first arithmetic means output value; and
a throttle value servo mechanism responsive to said control signal for adjusting the throttle valve angular position by an amount corresponding to the value of said control signal.

5. The control system as set forth in claim 4, wherein said power train comprises said engine and a power transmission having an output shaft, and said second sensor is associated with said transmission output shaft for monitoring output speed on said output shaft.

6. The control system as set forth in claim 4, wherein said first sensor is an electrical signal generator and part of said accelerator serves as a movable electro-active element of said signal generator.

7. A throttle valve control system for an internal combustion engine comprising:
a manually operable accelerator;
a throttle valve disposed within an air induction passage of the engine for controlling intake air flow rate therethrough;
an electrically operable throttle valve servo mechanism associated with said throttle valve to control the open degree of the latter according to a control signal;
a manually operable mode selector for selecting one of a plurality of preset operation modes of the control system, each of which has unique speed demand variation characteristics relative to a first sensor signal value;
a first sensor associated with said accelerator for monitoring the position of said accelerator and producing said first sensor signal indicative of the position of said accelerator;
a power train including said engine and having an output shaft for driving vehicular driving wheels;
a second sensor associated with said output shaft of said power train for monitoring output speed thereon, said second sensor producing a second sensor signal indicative of the output speed on said output shaft;
a controller receiving said first sensor signal and second signal, deriving an output speed demand on the basis of said first sensor signal value according to preset characteristics of variation of output speed demand depending upon said first sensor signal value, said controller uses one of a plurality of preset characteristics depending upon the mode selected by said manually operable mode selector deriving the difference between the derived output speed demand and said second sensor signal value representative of the actual output speed, and generating a control signal acting on said throttle valve servo mechanism so as to reduce said difference to zero.

8. A process for controlling intake air flow rate through an air induction system of an internal combustion engine by means of a throttle valve, comprising the steps of:
selecting one of a plurality of distinct variation characteristics of desired speed relative to the accelerator position, and wherein the desired speed value is derived in accordance with the selected desired speed variation characteristics;
deriving a desired magnitude of speed to be outputted through a power train including the engine on the basis of the position of a manual accelerator;
monitorig actual output speed on said power train;
calculating the difference between said desired speed and said actual speed;
deriving a control signal having a value acting to reduce the difference between said desired speed and said actual output speed toward zero; and
feedback controlling a throttle valve servo system associated with said throttle valve so as to actuate said throttle value to a degree corresponding to the control signal value.

9. The process as set forth in claim 8, wherein said control signal is an electrical signal for operating said servo system electrically.

* * * * *